(12) United States Patent
Suck et al.

(10) Patent No.: US 9,579,992 B2
(45) Date of Patent: Feb. 28, 2017

(54) LONGITUDINAL GUIDE FOR A MOTOR VEHICLE SEAT

(71) Applicant: Brose Fahrzeugteile GmbH & Co. KG, Coburg, Coburg (DE)

(72) Inventors: Wolfgang Suck, Coburg (DE); Nick Röhnert, Chemnitz (DE); Karsten Hartleb, Weitramsdorf (DE); Andreas Prause, Coburg (DE); Bernd Griebel, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 14/798,584

(22) Filed: Jul. 14, 2015

(65) Prior Publication Data

US 2015/0314704 A1    Nov. 5, 2015

Related U.S. Application Data

(63) Continuation of application No. 13/700,196, filed as application No. PCT/EP2011/058849 on May 30, 2011, now Pat. No. 9,108,533.

(30) Foreign Application Priority Data

May 28, 2010 (DE) .......... 10 2010 021 852
Jun. 10, 2010 (DE) .......... 10 2010 017 328

(Continued)

(51) Int. Cl.
*B60N 2/07* (2006.01)
*B60N 2/06* (2006.01)
*B60N 2/08* (2006.01)

(52) U.S. Cl.
CPC .............. *B60N 2/07* (2013.01); *B60N 2/062* (2013.01); *B60N 2/072* (2013.01); *B60N 2/0705* (2013.01);

(Continued)

(58) Field of Classification Search
CPC ........ B60N 2/062; B60N 2/07; B60N 2/0705; B60N 2/0715; B60N 2/0806; B60N 2/072; B60N 2/0722

(Continued)

(56) References Cited

U.S. PATENT DOCUMENTS 2,153,734 A     4/1939  Westrope
2,725,092 A  *  11/1955 Cartwright ................... 248/430

(Continued)

FOREIGN PATENT DOCUMENTS

DE     2 318 664       10/1974
DE     30 22 344 A1    12/1981

(Continued)

OTHER PUBLICATIONS

International Search Report and Written Opinion for International Application No. PCT/EP2011/058849 mailed Jul. 18, 2011.

(Continued)

*Primary Examiner* — Eret McNichols
(74) *Attorney, Agent, or Firm* — Renner, Otto, Boisselle & Sklar, LLP

(57) ABSTRACT

A longitudinal guide for vehicle seats including two elongate rails, each including a lower rail, an upper rail supported on the lower rail and displaceable longitudinally, two bearing areas for guiding means, the bearing areas lying diagonally opposite to and being biased against each other, each upper rail and lower rail having an L-shaped region, if viewed in profile, formed by a base leg and an L-leg that protrudes from the base leg substantially perpendicularly, and two end regions, which adjoin the L-shaped region, each end region of the upper or lower rail together with the end region of the associated lower or upper rail forming an embracing area by mutually hooking, end regions of the upper rail forming bearing areas with opposite portions of the associated lower (Continued)

rail, and a plurality of balls are supported in a first bearing area on the end region having a circular arc-shaped profile.

13 Claims, 22 Drawing Sheets

(30) Foreign Application Priority Data

| Jun. 10, 2010 | (DE) | ................. 10 2010 017 329 |
|---|---|---|
| Jun. 10, 2010 | (DE) | ................. 10 2010 017 330 |
| Nov. 12, 2010 | (DE) | ................. 10 2010 060 538 |
| Mar. 29, 2011 | (DE) | ................. 20 2011 000 716 U |
| Apr. 21, 2011 | (DE) | ................. 20 2011 000 957 U |

(52) U.S. Cl.
CPC ......... *B60N 2/0715* (2013.01); *B60N 2/0722* (2013.01); *B60N 2/0806* (2013.01); *B60N 2/0818* (2013.01); *B60N 2/0875* (2013.01)

(58) Field of Classification Search
USPC ........................................ 248/419, 424, 429
See application file for complete search history.

(56) References Cited

U.S. PATENT DOCUMENTS

| 3,248,839 | A | | 5/1966 | Roberts et al. |
|---|---|---|---|---|
| 3,944,302 | A | | 3/1976 | Fourrey |
| 5,109,646 | A | | 5/1992 | Colonias et al. |
| 5,181,360 | A | | 1/1993 | Shingler |
| 5,522,665 | A | | 6/1996 | Baloche et al. |
| 5,741,000 | A | | 4/1998 | Goodbred |
| 5,782,138 | A | | 7/1998 | Groche |
| 5,816,110 | A | | 10/1998 | Schuler et al. |
| 5,961,088 | A | | 10/1999 | Chabanne et al. |
| 5,984,254 | A | | 11/1999 | Baloche et al. |
| 6,059,248 | A | * | 5/2000 | Bauer et al. ................. 248/430 |
| 6,079,688 | A | * | 6/2000 | Levillain et al. ............ 248/429 |
| 6,138,974 | A | | 10/2000 | Okada et al. |
| 6,439,531 | B1 | | 8/2002 | Severini et al. |
| 6,637,712 | B1 | | 10/2003 | Lagerweij |
| 6,764,054 | B2 | | 7/2004 | Becker et al. |
| 7,207,541 | B2 | | 4/2007 | Frohnhaus et al. |
| 7,303,223 | B2 | | 12/2007 | Nakamura et al. |
| 7,503,537 | B2 | | 3/2009 | Koga |
| 7,597,303 | B2 | | 10/2009 | Kimura et al. |
| 7,600,816 | B2 | | 10/2009 | Bauersachs et al. |
| 7,722,006 | B2 | | 5/2010 | Beneker et al. |
| 7,980,525 | B2 | | 7/2011 | Kostin |
| 8,006,949 | B2 | | 8/2011 | Kojima et al. |
| 8,029,063 | B2 | | 10/2011 | Kazyak et al. |
| 2003/0164434 | A1 | | 9/2003 | Frohnhaus et al. |
| 2004/0084926 | A1 | | 5/2004 | Muller et al. |
| 2004/0164600 | A1 | | 8/2004 | Rausch et al. |
| 2005/0012013 | A1 | | 1/2005 | Dill et al. |
| 2005/0285008 | A1 | | 12/2005 | Beneker et al. |
| 2006/0237619 | A1 | | 10/2006 | Nakamura |
| 2007/0181769 | A1 | | 8/2007 | Chung et al. |
| 2009/0267396 | A1 | | 10/2009 | Hofmann et al. |
| 2009/0322136 | A1 | | 12/2009 | Kazyak et al. |
| 2010/0065708 | A1 | | 3/2010 | Koga |
| 2010/0327139 | A1 | | 12/2010 | Wojatzki et al. |
| 2011/0031774 | A1 | | 2/2011 | Koga |
| 2011/0163217 | A1 | | 7/2011 | Kimura et al. |
| 2011/0240820 | A1 | | 10/2011 | Napau et al. |
| 2012/0074289 | A1 | | 3/2012 | Kimura et al. |
| 2013/0075571 | A1 | | 3/2013 | Suck et al. |
| 2013/0341983 | A1 | * | 12/2013 | Kimura ..................... 297/344.1 |
| 2015/0291062 | A1 | * | 10/2015 | Yamada et al. |

FOREIGN PATENT DOCUMENTS

| DE | 42 37 808 A1 | 5/1994 |
|---|---|---|
| DE | 0 673 799 A1 | 9/1995 |
| DE | 196 02 250 A1 | 7/1997 |
| DE | 197 17 667 A 1 | 10/1998 |
| DE | 198 11 094 A 1 | 10/1999 |
| DE | 199 22 294 A 1 | 11/2000 |
| DE | 199 37 652 A 1 | 2/2001 |
| DE | 100 39 511 A1 | 2/2002 |
| DE | 101 27 153 A1 | 11/2002 |
| DE | 698 13 097 T2 | 10/2003 |
| DE | 203 13 952 U1 | 2/2005 |
| DE | 20 2004 010 499 U1 | 12/2005 |
| DE | 10 2004 044 716 A1 | 3/2006 |
| DE | 10 2006 047 626 A1 | 8/2007 |
| DE | 20 2006 016 652 U1 | 4/2008 |
| DE | 20 2007 015 163 U1 | 4/2008 |
| DE | 60 2005 002 720 T2 | 7/2008 |
| EP | 0 845 384 A1 | 6/1998 |
| EP | 0 947 380 A1 | 10/1999 |
| EP | 1 316 466 A1 | 6/2003 |
| EP | 1 413 472 A2 | 4/2004 |
| EP | 1 432 103 A2 | 6/2004 |
| EP | 1 498 299 A1 | 1/2005 |
| EP | 1 671 836 A2 | 6/2006 |
| WO | 95/17317 | 6/1995 |
| WO | 96/11123 | 5/1996 |
| WO | 2006/053145 | 5/2006 |
| WO | 2006/106044 | 10/2006 |

OTHER PUBLICATIONS

Search Report for corresponding Application No. DE 10 2010 017 328.2 dated Jan. 31, 2011.
Search Report for corresponding Application No. DE 10 2010 017 329.0 dated Jan. 31, 2011.
Search Report for corresponding Application No. DE 10 2010 017 330.4 dated Jan. 31, 2011.
Search Report for corresponding Application No. DE 10 2010 060 538.7 dated Sep. 22, 2011.
Official Action for Corresponding Chinese Application No. 201180026652.7 dated Sep. 3, 2014.
International Preliminary Report on Patentability for International Application No. PCT/EP2011/058849 mailed Dec. 13, 2012.
Corresponding U.S. Appl. No. 13/700,196, filed Dec. 14, 2012.
Corresponding U.S. Appl. No. 14/798,645, filed Jul. 14, 2015.

* cited by examiner

LONGITUDINAL GUIDE FOR A MOTOR VEHICLE SEAT

CROSS-REFERENCE TO RELATED APPLICATIONS

The present application is a continuation of, and claims priority, under 35 U.S.C. §120, of U.S. application Ser. No. 13/700,196, filed 27 Nov. 2012, and a 35 U.S.C. §371 date of 14 Dec. 2012, now issued as U.S. Pat. No. 9,108,533, which is the U.S. National Stage of International Application No. PCT/EP2011/058849, filed 30 May 2011, published as WO 2011/147991 A1, which in turn claims priority to the following German patent or utility model applications: DE 10 2010 021 852 "Longitudinal guide for a motor vehicle seat", filed on 28 May 2010; DE 10 2010 017 328 "Longitudinal guide for a motor vehicle seat," filed on 10 Jun. 2010; DE 10 2010 017 329 "Longitudinal guide for a motor vehicle seat" filed on 10 Jun. 2010; DE 10 2010 017 330 "Longitudinal guide for a motor vehicle seat," filed on 10 Jun. 2010; DE 10 2010 060 538 "Longitudinal guide for a motor vehicle seat" filed on 12 Nov. 2010; DE 20 2011 000 716 "Longitudinal guide for a motor vehicle seat", filed on 29 Mar. 2011, DE 20 2011 000 957 "Longitudinal guide for a motor vehicle seat", filed on 21 Apr. 2011, the whole content of each of which is hereby expressly incorporated by reference for disclosure purposes.

FIELD OF THE INVENTION

The present invention relates to a longitudinal guide for a motor vehicle seat with two lower rails, which are directly or indirectly fixed to the bottom of the interior on both sides of the motor vehicle seat.

BACKGROUND OF THE INVENTION

In the case of such a longitudinal guide on each lower rail a slidable upper rail is disposed such that both rails form profile a substantially rectangular cross-section in their functional position, wherein bearing areas of the upper rail are formed on the lower rail as an embracing portion, which are disposed at the two corner areas of the rail profiles essentially diagonally opposite to each other and which have associated guiding means, wherein end portions of the lower rail and of the upper rail are respectively formed as essentially U-shaped profiles in the bearing areas, which are engaged with each other.

WO 2006/106044 A1 of the Applicant discloses such a longitudinal guide, wherein a first upper bearing area, which uses a plurality of balls as guiding means, and a second lower bearing area, which is diagonally opposite to the first bearing area and uses as guiding means a combination of rollers for supporting on a base leg of the lower rail and balls, are biased against each other in diagonal direction in order to accomplish a high rigidity of the rail profile. The balls in the first bearing area are mounted between two circular arc-shaped profiles, wherein one of the circular arc-shaped profiles forms a corner area at the upper end of a connecting leg of the lower rail, which is upwardly inclined at an acute angle and projects outwards relative to the rail.

Despite advantageous characteristics of this rail profile, there is still room for further improvement, particularly as in terms of the installation space available for this purpose, the total width and the width at the lower end of the rail profile as well as in terms of rigidity and the material or total weight required to implement it. Important in this context are particularly mechanical characteristics, especially the rigidity and torsional rigidity of the rail profile in the event of a crash, be it a frontal or rear crash or a side crash.

DE 197 17 667 A1 discloses a further longitudinal guide for motor vehicle seats, wherein the end portions of the upper rail, which end in the bearing areas that are diagonally opposite to each other, are formed with multiple curved section so that in each embracing portion respective two channels for balls are provided, if viewed in a cross sectional view, which act as guiding means. Precise formation of such end portions can be accomplished only in a relatively complicated manner, so that the tolerances are relatively high. The play of the longitudinal guide is further enlarged due to the higher wear, which results from the point contact of the ball-bearing guides.

JP 2004 203264 A discloses a further longitudinal guide for a motor vehicle seat, wherein a second bearing area in the sense of the present application is provided but not at the same time a ball guide and a roller guide, but instead two ball guides. There exists no supporting leg, which is associated to the upper ball bearing and which includes an acute angle with another supporting leg. Rather, the ball is received in an arcuately shaped longitudinal bead.

EP 1 336 765 A discloses a longitudinal guide with double pairs of ball guides in each bearing area.

Further prior art is disclosed in the documents EP 1 621 390 A, DE 10 2004 061140 A, FR 2 872 102 A and US 2005/285008 A.

SUMMARY OF THE INVENTION

It is an object of the present invention to enhance a longitudinal guide of the afore-mentioned kind to the effect that an enhanced mechanical rigidity especially in the event of a crash can be accomplished with a simple mechanical design and with minimum weight and material consumption. According to a further aspect of the present invention, the longitudinal guide shall absorb loads more effectively, especially in the event of a crash.

According to the present invention these objects are achieved by a longitudinal guide with the features according to claim 1. Further advantageous embodiments are the subject-matter of the dependent claims.

Thus the present invention is based on a longitudinal guide for vehicle seats, in particular for motor vehicle seats, comprising two elongate rails, each having a lower rail and an upper rail supported on the lower rail so as to be longitudinally movable, and two bearing areas for guiding means disposed diagonally opposite to each other and biased against each other, each upper and lower rail having an L-shaped region, if viewed in profile, which is formed by a base leg and an L-leg projecting essentially perpendicularly therefrom, and two end portions connected to the L-shaped region, each end portion of the upper or lower rail forming an embracing portion with the end of the associated lower or upper rail under mutual interlocking, and the end portions of the upper rail together with opposite portions of the associated lower rail forming the bearing areas, and wherein a plurality of balls are supported in a first bearing area at the end portion, which is formed as a circular arc-shaped profile.

According to the invention, the first bearing area is formed by a corner area of the lower rail and the end portion of the upper rail, which is formed as a circular arc-shaped profile, in order to support the plurality of balls, wherein a first connecting leg projects from the L-leg of the L-shaped region of the lower rail horizontally or slightly inclined below a bending area of the upper rail and projects outwards and wherein the corner area is formed at a second connecting leg that is connected with the first connecting leg.

According to a first embodiment the aforesaid first, outwardly projecting connecting leg can extend upwards relative to a horizontal line or to the base leg of the lower rail under a relatively small acute angle, in particular in the range between 10° to 30°, preferably 15° to 20°.

According to a further preferred embodiment, the first connecting leg may alternatively extend substantially in a horizontal direction and outwardly from the L-leg of the L-shaped region of the lower rail. In such an embodiment a particularly effective support of an opposite leg of the profile can be accomplished in particular under the action of substantially downwardly directed forces, such as these may occur for example in the event of a crash, in that the opposite leg of the profile is pressed downward and finally gets into contact with the first connecting leg which extends in horizontal direction and outwardly. A further sliding of the opposite leg directed inwards into the rail is thereby effectively prevented by the substantially horizontal direction of the first connecting leg.

According to a further preferred embodiment the first connecting leg may alternatively extend at a relatively small acute angle relative to a horizontal line or to the base leg of the lower rail downward, in particular by an angle in the range between 10° to 30°, preferably 15° to 20°. In such an embodiment a particularly effective support of an opposite leg of the profile can be accomplished in particular under the action of substantially downwardly directed forces, such as these may occur for example in the event of a crash, in that the opposite leg of the profile is pressed downward and finally gets into contact with the first connecting leg extending obliquely downward and outwardly. A further sliding of the opposite leg directed inwardly into the rail is thereby effectively prevented, since the opposite leg of the profile can only continue sliding outwardly from the rail in the case of a contact to the first connecting leg extending obliquely downward, but cannot slide inwardly into the rail while being in contact.

According to a further embodiment the contact points of the balls at the end portion in the form of a circular arc-shaped profile, as viewed from an interior of the rails, are particularly preferably on a side opposite of a virtual center line through the L-leg of the L-shaped region of the lower rail. Here, the contact points of the balls preferably can be very close to the virtual center line, so that the absorption of forces acting in the vertical direction directly into the underneath L-leg of the lower rail can be accomplished, which is more stable, i.e. has a higher material thickness, which enables very short levers for absorption of forces and thus further increases the stiffness. In comparison to the prior art, where the first bearing area is always located completely outside of the rectangular inner region of the longitudinal guide, the first bearing area, which is located near the top of the longitudinal guide, partially overlaps with the inner space, so that the width of the longitudinal guide at the lower end thereof (or the projection of the first bearing area on the base leg of the lower rail) overall can be significantly shortened. This provides significant advantages and additional degrees of freedom in the design of the interior of motor vehicles. In particular, the necessary space for the longitudinal guide in the transverse direction of the vehicle can be reduced, in particular directly on the floor of the vehicle interior.

The corner area formed by the two connecting legs in conjunction with the opposite circular arc-shaped bearing profile and the balls supported in between in the bearing area results in an advantageously high rigidity in the first bearing area. Particularly an escape of the balls in the vertical or horizontal direction is effectively prevented even at high loads, such as these can occur in the event of a crash. Because the balls are partially embraced, as defined by the circular arc-shaped bearing profile, and due to the corner area, the inner curvature of which matches with the radius of curvature of the balls to be supported and is preferably slightly smaller than this radius of curvature, can the balls be supported very precisely in the first bearing area, which is advantageous for the overall tolerances of the longitudinal guide and their adjustment characteristics and which enables a relatively low surface pressure at the contact points of the balls with associated bearing areas.

According to a further embodiment the two connecting legs enclose with each other an angle in the range from 100° to 120°, more preferably an angle in the range from 112.5° to 107.5°, and more preferably an angle of about 110°, to accomplish a high rigidity and a precise support in the first bearing area.

According to a further embodiment, the aforementioned corner area is connected to a first connecting leg, which projects outwards from the L-leg of the L-shaped region of the lower rail and to a subsequent second connecting leg, which extends obliquely upwardly and outwardly from the rail profile. The first connecting leg conveniently has a relatively short length, so that the balls to be supported in the first bearing area are not located too far outside of the L-shaped region of the lower rail. Here, the second inclined connecting leg conveniently projects under an acute angle, particularly an angle in the range between 50° and 70°, more preferably of about 60°, obliquely upwardly and in the direction of the corner area. For this purpose, the material of the lower rail is suitably bent. This configuration allows an advantageously high stiffness while exhibiting a convenient resilient behavior under normal loads.

Very particularly preferably in accordance with a further embodiment, the distance of the contact points to the virtual center line is less than a material thickness of the upper rail, and in particular of the order of half the material thickness of the upper rail. However according to a further embodiment, the distance of the contact points to the virtual center line can in principle correspond to the material thickness of the upper rail or be of the same order.

According to a further embodiment, the contact points of the balls in the first bearing area are also on one or a little outside of a virtual extension line of the outer side of the L-leg of the L-shaped region of the lower rail, as seen from the inside of the rails. Here, the distance between the contact points to the virtual extension line is preferably in any case considerably smaller than the material thickness of the upper or lower rail. It is an advantage that at a certain strain of the longitudinal guide due to a vertical load, especially by a normal-weight person sitting on the vehicle seat, the contact points can just come to lie on the virtual extension line (or in its immediate vicinity) and so forces can be absorbed and transferred even more effectively.

According to a further embodiment, the dimensions of all gaps in the embracing portions of the bearing areas in the vertical direction (z), i.e. in the direction perpendicular to the base leg of the L-shaped region of the lower rail, are all the same and smaller than a material thickness of the upper rail. By this measure, even in the event of a side crash with excessive forces acting on the longitudinal guide in the transverse direction of the vehicle and resulting plastic deformation of the rail profiles a simultaneous contact of portions of the rail profiles, which are directly opposite to each other in the transverse direction of the vehicle, is made possible, which results in an additional stiffening of the rail profiles in a transverse direction of the vehicle and thus results in more favorable crash characteristics.

According to a further embodiment, the dimensions of all gaps in the embracing portions of the bearing areas parallel to the base leg of the L-shaped region of the lower rail are all the same and smaller than a material thickness of the upper rail. Thus, in the event of a side crash with an excessive force acting on the longitudinal guide in the vehicle transverse direction and thereby caused plastic deformation of the rail profiles a simultaneous contact of portions of the said profile, which are opposite to each other in the transverse direction of the vehicle is made possible, which results in an additional stiffening of the rail profile in the transverse direction, thus leading to more favorable characteristics in the event of a side crash.

According to a further embodiment an upper surface of the base leg of the L-shaped region of the upper rail protrudes from an upper reversal area of the lower rail in the embracing region of the first bearing area by a predetermined distance, this distance being smaller in an unloaded state of the longitudinal guide than two times the material thickness of the upper rail. This allows a certain amount of "breathing" of the rail profile upon a vertical load, in particular in the operating position when a relatively heavy weight person takes place on the vehicle seat. In this loaded normal state the rail profile can sag or collapse to the extent that dimensions of the gaps in the vertical direction are reduced accordingly, for example up to the order of about 0.5 mm for most obese people, having a body weight of, for example, 120 kg to 150 kg.

According to a further embodiment, a predetermined bending position is provided in the transition area between a connecting leg, which is opposite to the L-leg of the upper rail, and the adjoining end portion. While the connecting leg and the predetermined bending position are followed by a first bearing area, the L-leg of the upper rail is followed by a second bearing area, which is diagonally opposite to the first bearing area. The predetermined bending position thus allows a considerably higher load of the longitudinal guide in the vertical direction (z) as compared with the prior art without modifications of the ball guide, but at the same time enables a higher stiffness in extreme situations, in particular in the event of a crash, when high accelerating and deforming forces act on the longitudinal guide. In such extreme situations the predetermined bending position leads to a controlled deformation or bending of the longitudinal guide and transfers it into a state in which a high degree of stiffness and torsional strength is accomplished. At the same time the predetermined bending position results virtually in a load reversal so that a substantially vertical load basically becomes a load in the transverse direction of the longitudinal guide, which can be absorbed efficiently due to the higher material thickness and stiffness of the rail profile of the lower rail.

The predetermined bending position is in particular configured such that vertical downward forces result in a bending of the upper rail both in vertical direction (z) and in the vehicle transverse direction (y). In cooperation with the diagonally opposite second bearing area, which decomposes downward forces in a corresponding manner into two force components, namely, a force component in the vertical direction (z) and a force component in the vehicle transverse direction (y), however, in the opposite direction, thus a higher stiffness of the longitudinal guide can be accomplished. Thus, in particular the overall height of the longitudinal guide can be increased, and for achieving a predetermined stiffness a smaller width of the lower rail or a smaller overall width is necessary.

According to a further embodiment, such a predetermined bending position is formed in an advantageously simple manner such that it is less stiff than an adjacent bent or curved region of the upper rail, which can be accomplished in particular by the fact that the one or more adjacent bent or curved regions of the upper rail is provided with an embossing or embossment formed by cold working.

Such embossings or embossments can be implemented in particular by means of projections, bevels or the like using bending tools, wherein it is preferred that the embossings or embossments are formed uniformly curved.

The adjacent bent or curved regions, which are each provided with the embossment or embossing, are according to a further embodiment a corner area at the upper end of the L-shaped region of the upper rail and a transition area between an inclined connecting leg, which follows the connecting leg opposite to the L-leg of the upper rail, and an end portion of the upper rail, which is formed as a circular arc-shaped profile. The inclined connecting leg can thus allow for a compensating movement with components in both the vertical direction and in the vehicle transverse direction upon a normal loading of the longitudinal guide, and thus a certain degree of "breathing" of the rails in the vertical direction.

According to a first embodiment the inclined connecting leg can extend obliquely downwards and outwards from the rail or according to a second embodiment obliquely upwardly and outwardly from the rail. Herein a transition area between the connecting leg, which extends obliquely downward (or upward) and outwardly and the end portion of the upper rail (2), which is formed as a circular arc-shaped profile, is preferably formed as a bending position, which is located substantially on a virtual center line through the L-leg of the L-shaped region of the lower rail, which extends substantially perpendicularly from the base leg. More preferably, the bending position is located exactly on this virtual center line. Preferably, the distance of this bending position to this virtual center line is in any case much smaller than the material thickness of the upper rail and lower rail. By means of this configuration, a transfer of forces acting in vertical direction to the L-leg of the lower rail, which located directly below and is aligned and which is more stable, i.e. formed with increased material thickness, can be accomplished, which enables very short levers for the transfer of forces and thus a further increase in stiffness. In comparison to the prior art, according to which the first bearing area is always completely outside of the rectangular interior of the longitudinal guide, the first bearing area, which is located near the upper side of the longitudinal guide, partially overlaps with the inner space, so that the lower width of the longitudinal guide overall can be significantly smaller. This provides significant advantages and additional degrees of freedom in the design of the interior of motor vehicles. In particular, the necessary space for the longitudinal guide in the transverse direction can be reduced, in particular directly on the floor of the vehicle interior.

According to a further embodiment, the upper rail is bent by about 180° in region of the afore-mentioned bending position, i.e. is substantially formed as a reverse area wherein the profile of the upper rail substantially reverses its direction of extension. By means of this configuration a certain degree of elasticity is provided in the region of the bending position or of the reverse area, so that the rail can "breathe" sufficiently at normal load changes, but may still have a sufficient rigidity at extreme loads, particularly in the event of a crash.

In the aforementioned first embodiment wherein the inclined connecting leg extends obliquely downward and outwardly from the rail, a certain vertical load, resulting in particular from the weight of a normal weight person sitting on the vehicle seat, as described above, can be converted into a load in the transverse direction, resulting in a further increase of the diagonal biasing of the two bearing areas, and therefore contributes to a further increase in the stiffness of the longitudinal guide.

The aforesaid second embodiment, wherein the inclined connecting leg extends obliquely upwardly and outwardly from the rail is further optimized for crashes, since this connecting leg directly gets into contact with an opposite portion of the lower rail in the event of a crash.

According to a further embodiment, the bending position between the inclined connecting leg and the end portion of the upper rail formed as a circular arc-shaped profile is located at a distance to the aforementioned first inclined connecting leg of the lower rail, which extends obliquely upwards and outwardly from the rail and which directly follows the L-leg of the L-shaped region of lower rail. According to the invention a particular advantageous support of the opposite bending position and hence of the entire first bearing area can be accomplished in the event of a crash. Namely, the bending position or the reversal area can be supported on the opposite inclined first connecting leg, without slipping, however, into the L-shaped region or into the interior of the lower rail. This is prevented in particular because the opposite inclined first connecting leg extends at a relatively small acute angle relative to a horizontal line.

According to a particularly preferred embodiment, in the second, diagonally opposite lower bearing area two groups of rollers are mounted, namely a plurality of first rollers, which are supported with lateral play between the base leg of the L-shaped region of the lower rail and a supporting leg of the upper rail, which is opposite thereto and extends in parallel therewith, and a plurality of second rollers, which are supported between the end portion of the upper rail, which extends obliquely upwards at an acute angle, and an opposite inclined supporting leg, which is opposite and extends in parallel and is located between a supporting leg, which adjoins the base leg and extends obliquely upwards, and an adjoining horizontal base leg of the embracing portion in the end portion of the lower rail. By means of the two groups of rollers overall an advantageously low surface pressure in the second bearing area can be accomplished, so that the rail profile is "ready for use" during use as compared to systems, in which a group of balls is provided in the second bearing area. Another advantage is that the rollers of the two groups of rollers always run at the same speeds. In systems where a group of balls is provided in the second bearing area, this is not always the case, since there the speed depends from the exact (load-dependent) point of contact. At identical speeds, however, there are no problems using a common bearing cage for both groups of rollers in the second bearing area. Another advantage is that by means of the inclined lines of the support of the upper group of rollers in the second bearing area, a weight force can be transferred from above to the bottom right corner area, without causing changes in the running behavior of the rails. In systems, in which a group of balls is provided in the second bearing area, there would be significant kinematic changes instead.

The rollers of the upper group of rollers in the second bearing area can in this case have a smaller diameter than the rollers of the lower group of rollers, for example a diameter of less than 3.0 mm, which enables a further extra space in the vertical direction in comparison to systems, in which a group of balls is provided in the second bearing area. Finally, a further extra space results from the fact that the upper group of rollers is supported on inclined supporting legs, so that the outer profile of the group of rails in this area has an inclined corner and thus a corner, which is further offset inwards.

OVERVIEW ON DRAWINGS

The invention will now be described by way of example and with reference to the accompanying drawings, from which further features, advantages and problems to be solved will become apparent. In the drawings:

FIG. 1b shows a sectional view of a longitudinal guide according to a modification of the first embodiment of FIG. 1a;

In the drawings, identical reference numerals designate identical or substantially equivalent elements or groups of elements.

DETAILED DESCRIPTION OF PREFERRED EMBODIMENTS

Figure 1A:
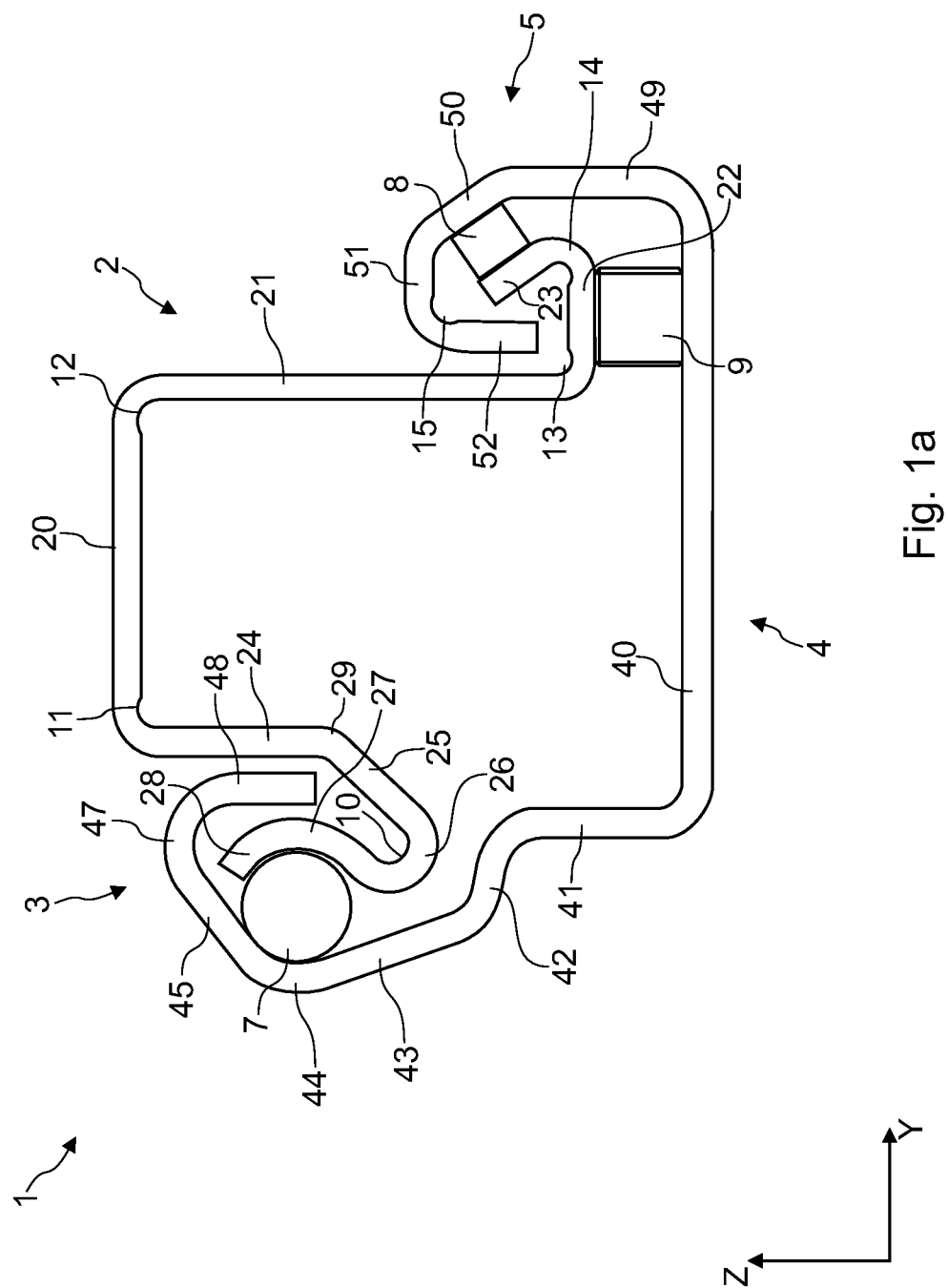
FIG. 1a shows a sectional view of a longitudinal guide according to a first embodiment of the present invention.

A vehicle seat not shown in the drawings is directly or indirectly fixed to the bottom of the interior of the motor vehicle, which is likewise not shown in detail, via two rail guides, which are disposed on both sides and extend in the longitudinal direction of the vehicle (x-direction). Here, the upper rail 2 is supported longitudinally displaceable on the bottom rail 4 and is locked by means of a locking device, as described below in more detail, at an appropriate position. In its operating position, that is, in the assembled state, the upper rail 2 and the lower rail 4 together form a substantially rectangular cross-sectional profile. Therein, the upper rail 2 and the lower rail 4 are each formed as an L-profile, as explained in more detail below, so that the bearing areas 3, 5 of the upper rail 2 on the lower rail 4 are diagonally opposite to one another. In order to prevent the upper rail 2 from lifting off from the lower rail 4, embracing portions are formed in the bearing areas 3, 5, which are discussed in detail below. Furthermore, the two bearing areas 3, 5 are biased against each other as a result of the geometry and material characteristics of the rail profiles. In all embodiments the rail profiles are formed without a profile branch, so they can be manufactured by forming a steel sheet blank, for example, by bending, embossing, rolling or similar. Although sheet steel is preferred as the material for the rail profiles 2, 4, generally also light metals can be used, in particular aluminum. The rail profiles can also be implemented in a mixed structure, for example, the lower rail 4 as an aluminum profile and the upper rail 2 as a steel sheet profile. To achieve a high stiffness and crash resistance, it is preferred, however, according to the invention when both rail profiles 2, 4 are made of sheet steel.

Each rail 2, 4, has a respective L-shaped region, if viewed in profile, which is approximately in the middle of their profile blank and which is respectively formed by a base leg and an associated L-leg, namely, in the case of the upper rail 2 by the base leg 20 and the L-leg 21 extending basically perpendicular and in the case of the lower rail 4 by the base leg 40 and the L-leg 41 extending basically perpendicular. Most preferred according to the invention is a right angle between the base leg and the associated L-leg. But conceivable are in principle also small angular deviations from this geometry. Each leg of a rail is in each case substantially parallel, preferably exactly parallel to an L-leg of the other rail, and also the two base legs 20, 40 extend parallel to each other. Essentially the base legs 20, 40 and the associated L-legs 21, 41, define a free interior space I within the rail profiles, which is rectangular. Hereinafter, this free interior space is also named a longitudinal channel and can generally be used for installation of components. Preferably, this inner space I is completely free of any guiding means. According to the invention, this longitudinal channel can be adjusted according to the specific application, for which purpose the lengths of the base legs, L-legs and other projecting legs of the upper and lower rail 2, 4, can be adjusted suitably. Thus, even relatively large free cross-sections can be implemented, for example, relatively high and/or relatively wide longitudinal channels. As explained in more detail below, the rail profile of the present invention is generally tuned and optimized for a high mechanical rigidity and torsional strength during a crash and at the same time for exceptionally low total width in transverse direction of the vehicle (y-direction) and ease of use. Other parameters for this complex optimization process are in particular the material strengths of the upper and lower rail 2, 4, bends and embossings of the rail profiles. Similarly, also the angular relationships can be adapted in a suitable manner.

If viewed in profile, each of the base legs 20, 40 and each of the L-legs 21, 41 is followed by an end portion which is formed as an embracing portion and in which suitable guiding means, are mounted, namely balls 7 in the first bearing area 3 and rollers 8, 9 in the diagonally opposite second bearing area 5, as outlined below, and in the case of an electrically operated longitudinal guide also slides or slide profiles.

More specifically, the L-leg 21 of the upper rail 2 is followed by a supporting leg 22, which projects under a right angle from it and extends in parallel with the base leg 40, and by an inclined supporting leg 23 (free end of the profile of the upper rail 2), which is bent at an acute angle and is formed flat or planar, that is without arcuate recesses. Furthermore, the base leg 40 of the lower rail 4 in the right-hand part of FIG. 1a is extended to the bending region between the supporting leg 22 and the inclined supporting leg 23. The base leg 40 is followed by a connecting leg 49, which is bent under a right angle and extends vertically, that is in z-direction (vertical direction), which merges into an inclined supporting leg 50, which is opposite to the inclined supporting leg 23 of the upper rail and extends parallel to the latter. In the region between the two inclined supporting legs 23, 50, the rollers 8 are mounted with a predetermined lateral clearance. The inclined supporting leg 50 is followed by a base leg 40 extending parallel to the base leg 51 in the right embracing portion. The front free end of this base leg 51 is bent at a preferably right angle, so that the front free end 52 extends into the gap between the L-leg 21 of the upper rail 2 and the inclined supporting leg 23. Thus, in the second bearing area 5 of the rail profile two embracing portions are formed, which are engaged with each other substantially like hooks.

In the left-hand part of FIG. 1a the base leg 20 of the upper rail 2 is followed by a connecting leg 24, which projects under a right angle and extends up to the front free end 48 of the lower rail 4 and is suitably bent in this area 29 to merge into an inclined connecting leg 25, which extends at an acute angle, in the embodiment of about 45°, from the connecting leg 24 downwardly and outwards from the rail. At the lower end of the inclined connecting leg 25, this leg is bent upwards in the region 26 and merges into a free end 28 of the upper rail 2, which is formed as a circular arc-shaped profile. For this purpose, the bending portion 26 at first merges into a short transition leg essentially extending in the z-direction, which is followed by circular arc-shaped area 28 having a predetermined radius of curvature and matching to the balls 7 to be supported. The front free end 28 of the profile of the upper rail 2 extends in this area at an acute angle, in the embodiment of about 55°, obliquely upward and outwards from the rail. Furthermore, the L-leg 41 of the lower rail 4 is followed by an inclined connecting leg 42, which is bent at an acute angle, in this embodiment of about 20° and extends obliquely upward and outwards from the rail, which is followed by a second angled connecting leg 43, which extends at an acute angle of for example about 25° relative to a vertical direction. This inclined connecting leg 43 is followed by an upper connecting leg 45, including an obtuse angle of about 110°. Between the second, inclined connecting leg 43 and the upper connecting leg 45, a corner area is formed, the inner curvature of which matches with the radius of curvature of the balls 7 mounted in this area and is in particular slightly smaller than this radius of curvature. In cooperation with the embracing portion 27 of the free end 28 of the upper rail 2 the corner area 44 bears the balls 7 reliably and precisely. According to FIG. 1a, the upper end of the second inclined connecting leg 43 is at approximately the same level as the front free end 28 of the upper rail 2. The upper reversing area 47 of the lower rail 4 is followed by a free end 48 of the rail profile of the lower rail 4, which protrudes into the gap between the connecting leg 24 and the free end 28 of the rail profile of the upper rail 2.

The transition area between the L-leg 41 and the first connecting leg 42 is preferably formed by a longitudinal bead. As can be concluded easily from FIG. 1a, the location of the balls 7 in the first bearing area 3 in the vehicle transverse direction (y-direction) is precisely defined by the corner area 44 and the associated circular arc-shaped bearing portion 27. Overall, the balls 7 are guided precisely.

The transition area between the L-leg 41 and the first connecting leg 42 is preferably formed by a longitudinal bead. As can be concluded easily from FIG. 1, the location of the balls 7 in the first bearing area 3 in the vehicle transverse direction (y-direction) is precisely defined by the corner area 44 and the associated circular arc-shaped bearing portion 27. Overall, the balls 7 are guided precisely.

As already mentioned, the rollers 8 and 9, respectively can be mounted in the diagonally opposite second bearing area 5 with a certain lateral play such that the balls 8 can make compensating movements in the transverse direction of the motor vehicle (y-direction) in the case of a load and in the longitudinal direction of the motor vehicle (x-direction) in the case of an adjustment. Furthermore, rollers are mounted between the base leg 40 and the parallel and opposite supporting legs 22 in the lower region of the second bearing area 5, which, owing to the line-shaped bearing of the rollers 9, do not work into the material of the rail profiles. The same also applies for the rollers 8. A bearing cage, which is not shown in FIG. 1 and which can be configured e.g. as described in the German utility model DE 20 2007 015 163 U1 of the applicant, which expressively shall be part of the present disclosure, connects the groups of rollers 8, 9 in the second bearing area 5 in order to avoid a movement of the rollers 9 in the transverse direction of the vehicle (y-direction). These roller cages are preferably formed integrally and from a plastic material. While in the case of a mechanically actuatable longitudinal adjustment device only rollers are used as guide means, as described above, in the case of an electrically actuated longitudinal adjustment device instead of the upper rollers 8 in principle also sliders or sliding profiles can be used in the second bearing area 5.

In this embodiment, the embracing portions are provided in the second bearing area 5 outside the rectangular area I delimited by the L-profiles, whereas the embracing portions in the first bearing area 3 partially protrude into this space, by which measure the overall width of the rail profile in the transverse direction can be significantly reduced according to the invention, resulting in a significant advantage of the rail profile according to the present invention. To allow nevertheless a sufficient rigidity and torsional strength, particularly in the event of a crash, the rail profile according to the present invention overall is relatively high, which further enhances a diagonal biasing of the two bearing areas 3, 5 and provides additional benefits in the use of the interior space I, especially opens new possibilities to lock or arrest a longitudinal adjustment device, as described in more detail below with reference to FIGS. 6 to 10.

Figure 3:
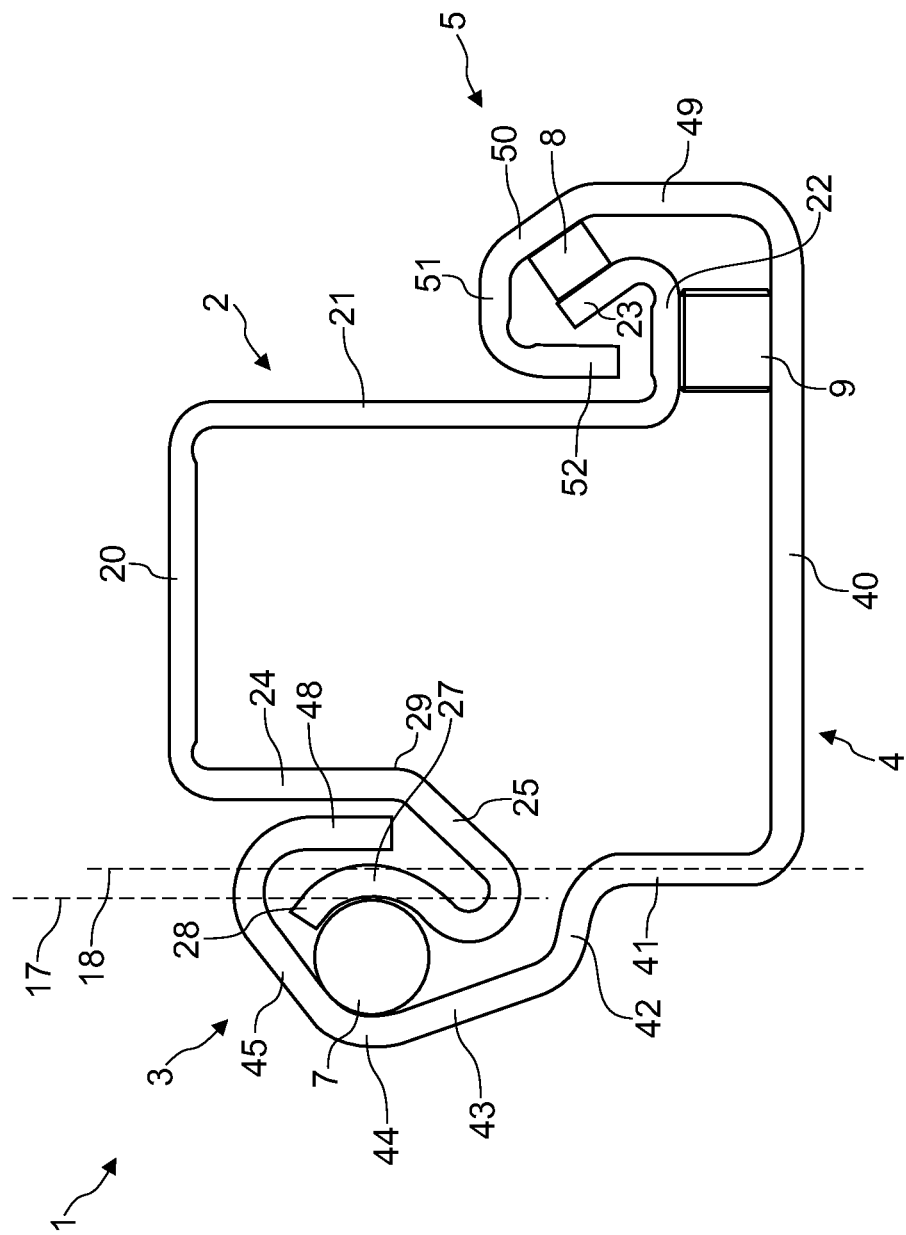
FIG. 3 shows the geometrical longitudinal guide according to FIG. 1a, wherein other important characteristics are shown.

As shown in FIG. 3, the contact points 19 of the balls 7 at the circular arc-shaped bearing area 27 of the upper rail 2 is slightly outside of a virtual center line 18 of the L-leg 41, if viewed from the interior of the rail profile. By "slightly" in this context especially a distance less than or equal to the thickness of the upper rail 2 is to be understood, more preferably less than half the thickness of the upper rail 2. In this way, the contact points 19 in the case of a certain elongation of the longitudinal guide by a vertical load, in particular by a person of normal weight sitting on the vehicle seat (not shown), can come to rest exactly on the virtual center line 18 of the L-arm 41, because the forces then can be transferred directly and linearly to the directly underlying L-leg 41 of the lower rail 4. According to a further embodiment the distance of the contact points 19 to the virtual center line 18 also can be negligible, so that the contact points 19 lie on the virtual center line 18. In this manner, the power flow in the bearing areas can be optimized under mutual entanglement of embracing portions, particularly in the event of a crash, because the forces resulting from the interlocking in the first bearing area 3 can be transferred directly and linearly in the directly underlying L-leg 41 of the lower rail 4. Specifically, the symmetry of the embracing portions 19 and the location of the contact points 19 can be configured such that the forces can be transferred exactly vertically (in z-direction) directly into the underlying L-leg 41 upon interlocking of the embracing portions. This allows an optimized power flow, particularly in the event of a crash. According to the invention therefore the material thickness of the upper rail 2 can be selected to be much smaller than the material thickness of the lower rail 4. In other words, at the same weight per unit length of the guide rails according to the invention a significantly higher rigidity and torsional strength can be accomplished, particularly in the event of a crash.

As can be concluded directly from FIG. 1a, because of the skew of the inclined supporting leg 23 in the second bearing area 5 an interlocking can be accomplished, which increases with an increasing load, which especially holds for the critical even of a crash. With increasing load in the vertical direction (z), the rollers 8 are pushed more and more into the associated bearing area 5. Since the lever length of the slanted supporting leg 23 is relatively short and, as will be described below, further measures for stiffening are taken in the transition area between the base leg 22 and supporting leg 23 (embossment of the rail profile), the relatively short inclined supporting leg 23 is bent to a relatively minor extent in the event of a crash as compared to other legs of the profile and thus serves as a precise reference surface for the rollers 8 to be supported. Thereby the rollers 9 in the second bearing area 5 perform compensating movements in transverse direction of the motor vehicle in the event of a crash or when a load is applied so that the rail profile tries to perform compensating movements in the y-direction upon vertical loads, in particular in the case of a crash, which are, however, significantly counteracted due to the significantly higher material thickness of the lower rail 4 according to the present invention, whereby overall a high stiffness and torsional strength is accomplished.

The inclined connecting leg 25 acts as a resilient arm, which enhances a diagonal biasing of the two bearing areas 3, 5 against each other. In order to precisely adjust the biasing force and displacement force, in the rail profile according to the present invention in particular the radius of the balls 7 can be suitably configured, which has a direct influence on the diagonal bias as a result of the geometry.

Further important in the rail profile according to the present invention is the cooperation of the embossings, which stiffen the material, and of a predetermined bending position at the inclined connecting leg 25. As shown in FIG. 1a, embossings 11, 12, which are formed by cold deformation (cold working) and have a smaller radius of curvature, are formed at the two ends of the base leg 20 of the upper rail 2. Such areas of higher dislocation density in the microstructure of the metal can be accomplished by means of suitable bending devices, which may be provided for example with longitudinal projections. Because of the embossings a local increase in the dislocation density is caused and thus a local hardening of the metal, which allows a higher stiffness. Overall, the total thickness of the material of the upper rail 2 may be reduced. According to FIGS. 1a and 1b, corresponding embossings or embossments are also provided in the areas 13 and 14 which serve to further stiffen the second bearing area 5, in particular the inclined supporting leg 23. Optionally also in the area 15 a corresponding embossment may be provided to stiffen the embracing portions of the lower rail 4. Further important in this context is the use of a corresponding embossment 10 in the transition area between the inclined connecting leg 25 and the bearing portion 27 of the balls 7 in the first bearing area 3, that is on the inside of the bent portion 26. Overall, all the bending positions in the profile of the upper rail 2 are provided with embossings or embossments, with the exception of the circular arc-shaped bearing area 27 of the balls 7 as well as a further angled portion, which is to serve as a predetermined bending position and is denoted in the figures by the reference numeral 29. In comparison to the adjacent curved or bent portions of the upper rail 2 the region 29 is formed to be less rigid, in particular to have a smaller torsional rigidity. In the event of a vertical load being applied to the rail profile, in particular in the event of a crash, this predetermined bending position 29 buckles at first, so that the profile of the upper rail 2 is bent in particular in the region 29, i.e. the inclined connecting leg 25 is pivoted about the predetermined bending position 29 like a lever. This reinforces the diagonal bias of the two bearing areas 3, 5, but also ensures that the gaps are maintained in the embracing portions (as see further embodiments further below) if a load is applied, especially in the event of a crash.

Figure 2:
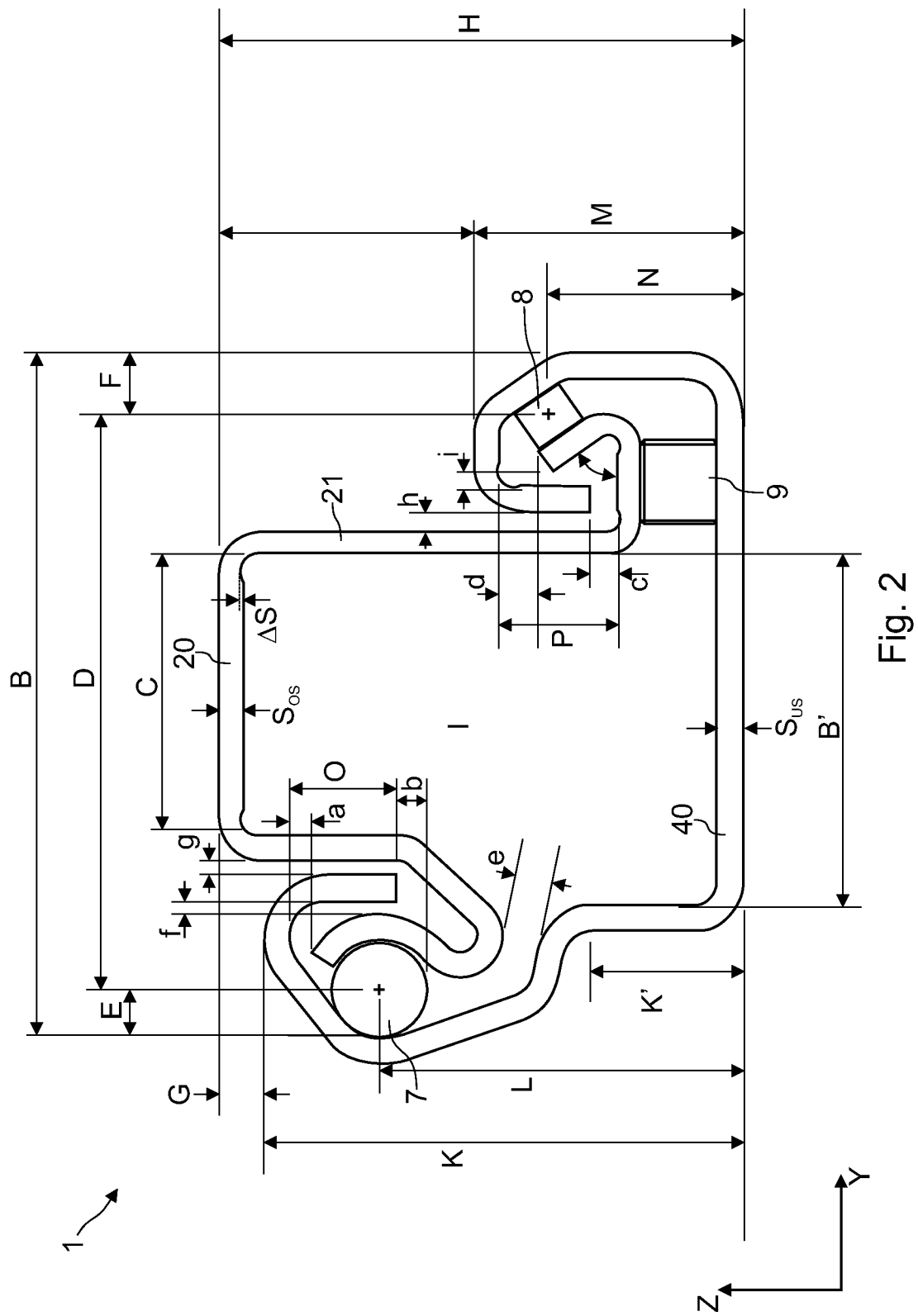
FIG. 2 shows the longitudinal guide according to FIG. 1a, wherein distances and lengths subsequently to be discussed are designated.

According to FIG. 1a the first connecting leg 42 of the profile of the lower rail 4 is spaced apart from the bending portion 26 of the upper rail 2 (gap e, see FIG. 2). In the event of a crash, that is, in the event of an excessive load in the z-direction, this enables a direct support of the bending region 26 on the first connecting leg 42, which is directly opposite, either in alignment with the L-leg 41 or in close proximity to the virtual center line 18 (FIG. 3) of the L-leg 41, in particular on the side of the same which is outside of the rail. The overlap of the bending portion 26 with the first connecting leg 42 can preferably correspond at minimum to the thickness of the lower rail, if viewed in vertical projection from above. In conjunction with a small gap size e (see FIG. 2) this enables a very effective support of the upper rail 2 on the lower rail 4 in the z-direction in the event of a crash. In the event of a crash, the region 29 without embossment serves as a predetermined bending position, which, as stated above, further enhances the diagonal bias of the two bearing areas 3, 5. In conjunction with the interlocking of the embracing portions in the second bearing area 5, which increases with an increasing load, this results in a very high stiffness of the rail profile.

A further increase in stiffness is caused by a cold work hardening of the material of the upper rail 2 in particular in the region of the embossings 10-15 in the event of a crash, when due to plastic deformation in particular in these regions the dislocation density in the metal microstructure is further increased.

Figure 1B:
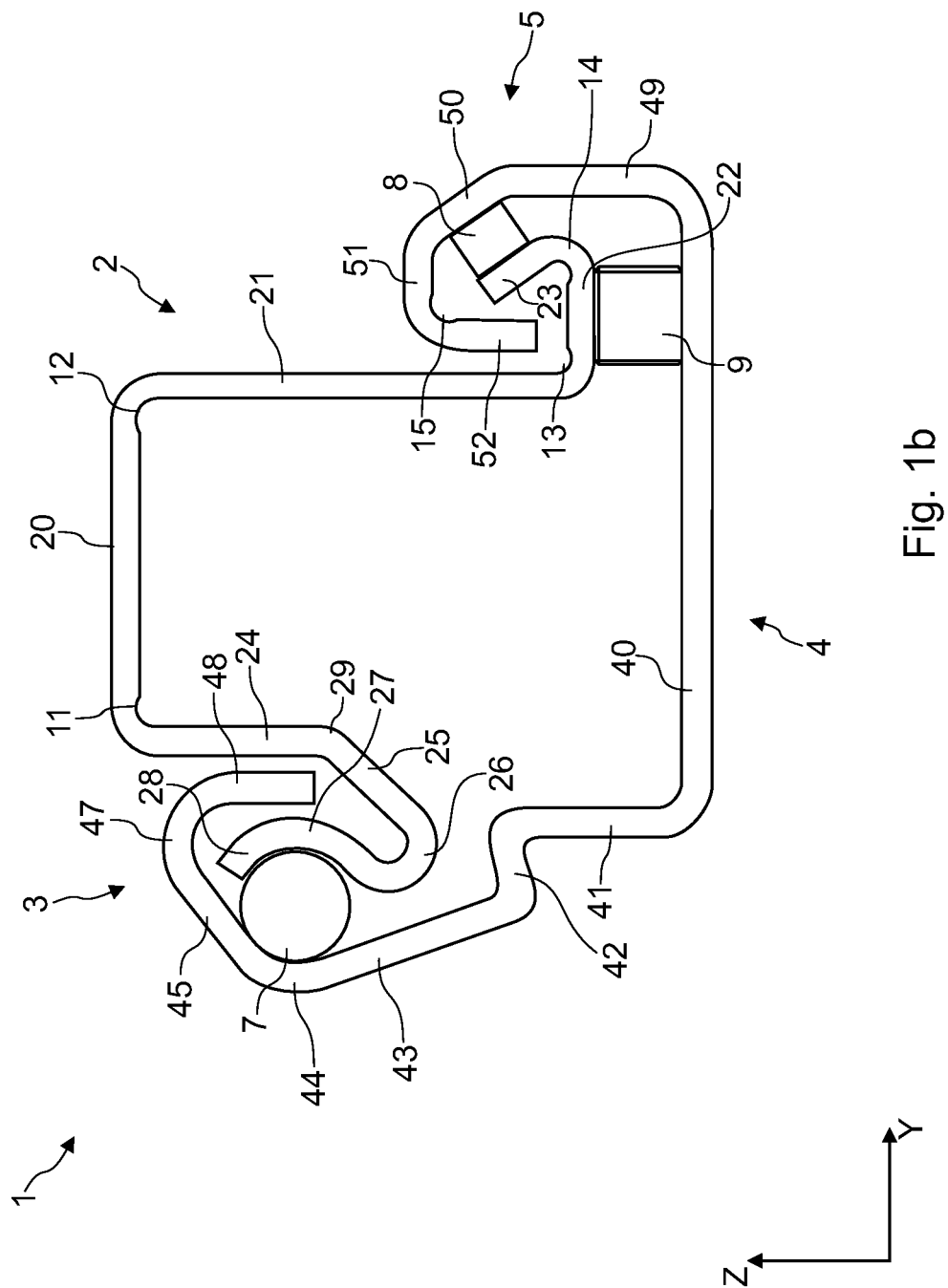

FIG. 1b shows a sectional view of a longitudinal guide according to a modification of the first embodiment of FIG. 1a, according to which the first connecting leg 42 extends downwards and outwards from the rail at a relatively small acute angle relative to a horizontal line or relative to the base leg 40 of the lower rail 4.

In the following the dimensions of the gaps existing in a rail profile in accordance with the first embodiment will be described in more detail by way of example with reference to FIG. 2. Firstly the dimensions of the gaps in the z-direction will be described, which are relevant for a frontal or rear crash. From FIGS. 1 and 2 one can derive that a gap of dimension a exists between the inside of the upper area of reversal 47 and the front free end 28, that a gap of dimension b exists between the front free end 48 and the outside of the inclined connecting leg 25, that a gap of dimension c exists between the front free end 52 and the upper side of the bearing leg 22 and that a gap of dimension d exists between the front end of the inclined bearing leg 23 and the bottom of the base leg 51. Furthermore, a gap of dimension e exists between the inside of the first connecting leg 42 and the bending portion 26. According to a preferred embodiment, the geometry of the rail profile is configured such that all gap dimensions a-d, preferably including the gap dimension e, are exactly the same, in line with the standard manufacturing tolerances. This allows at least in the event of a crash with intermediate tension, i.e. without a moment in the longitudinal direction of the vehicle, an exactly simultaneous force absorption and a mutual contact of directly opposite profile portions, so that a high stiffness can be accomplished, which is uniform over the entire rail profile. Also in the event of a crash with torque, i.e. of an off-center acting tension, the aforesaid simultaneous force absorption and direct support can be accomplished at least in section, if viewed in the longitudinal direction of the rail profile.

In the vehicle transverse direction (y) the following gap dimensions exist: a gap of dimension f exists between the inside of the circular arc-shaped bearing area 27 and the opposite free end 48, a gap of dimension g exists between the free end 48 and the connecting leg 24, a gap of dimension h exists between the L-leg 21 and the free end 52 and a gap of dimension I exists between the free end 52 and the front end of the inclined supporting leg 23. According to a further embodiment, which is optimized for a side crash situation, all the aforesaid gap dimensions in the y-direction are exactly the same, in line with the standard manufacturing tolerances, so that also (or alternatively) in the event of a side crash a simultaneous absorption of forces and a simultaneous contact between directly opposite portions of the rail profiles occurs.

Important to mention in this connection is the function of the embossings or embossments formed by cold working, which result in a further increase of the rigidity of the rail profiles in z-direction in the event of a crash.

In the following, other important aspects of the geometry and lever dimension of a rail profile according to the present invention, which are related to the high rigidity of the rail profile according to the invention, will be described with reference to FIGS. 2 and 3. It should be emphasized that the aspects to be described in the following in general may be combined and/or eliminated as desired. According to FIG. 2 the rail profile has a total width B and a total height H. The internal width of the inner space I is B'. Because the first bearing area 3 according to the invention is very close to the L-leg 41, according to the invention a ratio of B/W'=2.0 can be accomplished, while according to the prior art always B/B'>2.0 applied. In other words, the rail profile of the present invention can be formed very narrow in the region of the base leg as compared to the prior art while having a high rigidity and torsional strength, which can meet even high demands concerning the installation space in today's motor vehicles. It should be emphasized that this outstanding ratio cannot be implemented according to the prior art.

As regards the geometry of the bearing areas 3, 5, if K is the maximum height of the first bearing area 3, if L is the height or level of the center of the balls 7 in the first bearing area 3, if M is the maximum height of the second bearing area 5 and if N is the center of the balls 8 in the second bearing area 5, the following relationship may apply: M/N=K/L, in line with the manufacturing tolerances, wherein a maximum of about 4%, more preferably a maximum of 2% can be specified for the accuracy of the above ratios. The ratio M/N is in particular 1.33, while the ratio K/L is about 1.3.

If the height of the L-leg 41 up to the embossing or the transition area to the first connecting leg 42 is denoted by K', then further the following applies: (K−K')/K'=K/L, namely in line with the standard manufacturing tolerances in the range of one-tenth of a percent. In particular, this ratio can be 1.33.

Figure 4:
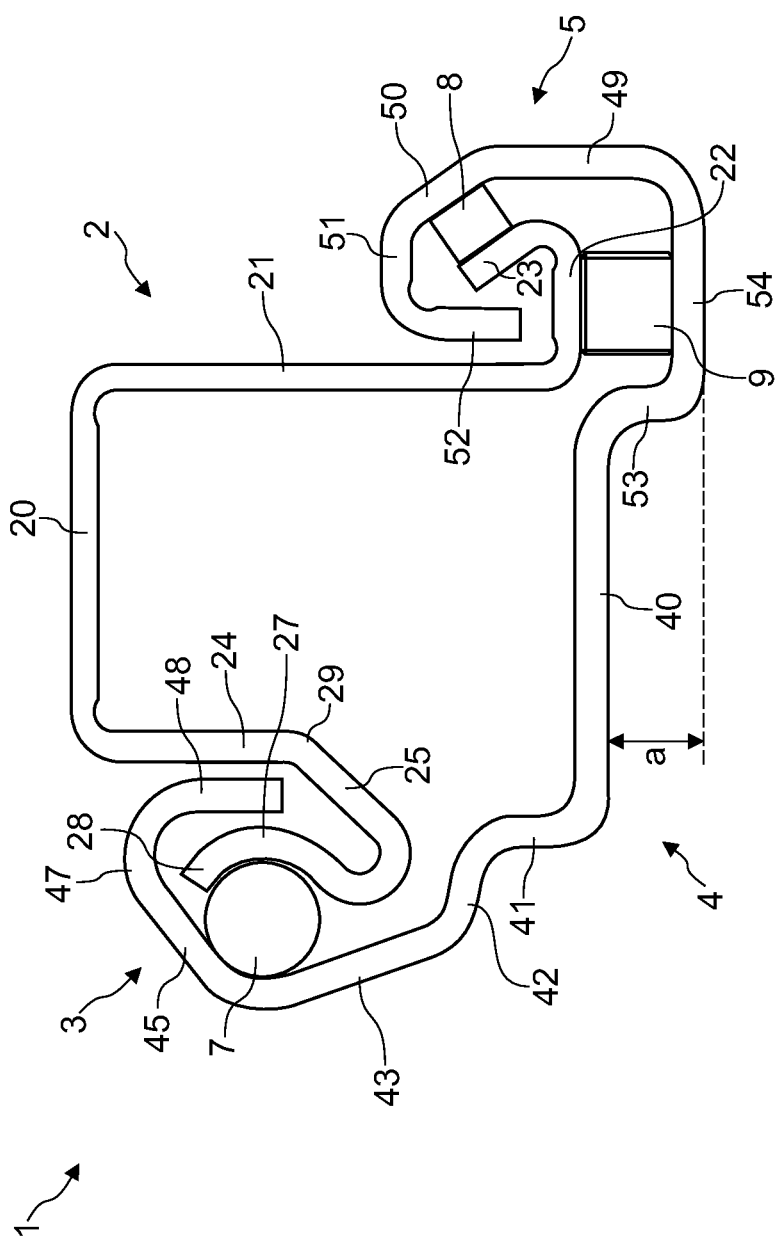
FIG. 4 is a sectional view of a second embodiment of the longitudinal guide according to the present invention.

Referring to FIG. 4, a second embodiment will be described, with the emphasis being placed in the description on the differences from the first embodiment. In contrast to the first embodiment, the base leg 40 is not formed flat but stepped, wherein the base leg 40 is followed by a substantially rectangularly bent connecting leg 53 still within the interior space I of the rail profile, which is followed by supporting leg 54 extending in parallel with the base leg 40, which is spaced apart to and in parallel with the supporting leg 22 and serves for mounting (supporting) the rollers 9 in the second bearing area 5. The height difference a between the supporting leg 54 and the base leg 40 can be for example 7.0 mm, and allows a free space formed below the interior space I, which can be used for other purposes, for example for locking of locking pins of a locking device of a longitudinal adjustment device of the longitudinal guide, which will be described in more detail below with reference to FIGS. 6 to 10. Alternatively, in the space thus formed also cables and/or wires can be guided. In order to support the rail profile on the bottom of the vehicle interior, blocks or sections may be used which are screwed, welded, glued or otherwise fastened to the bottom plate. The free space thus formed also allows mounting and installation operations for such locking devices, cables and/or wires in a different order.

Figure 5A:
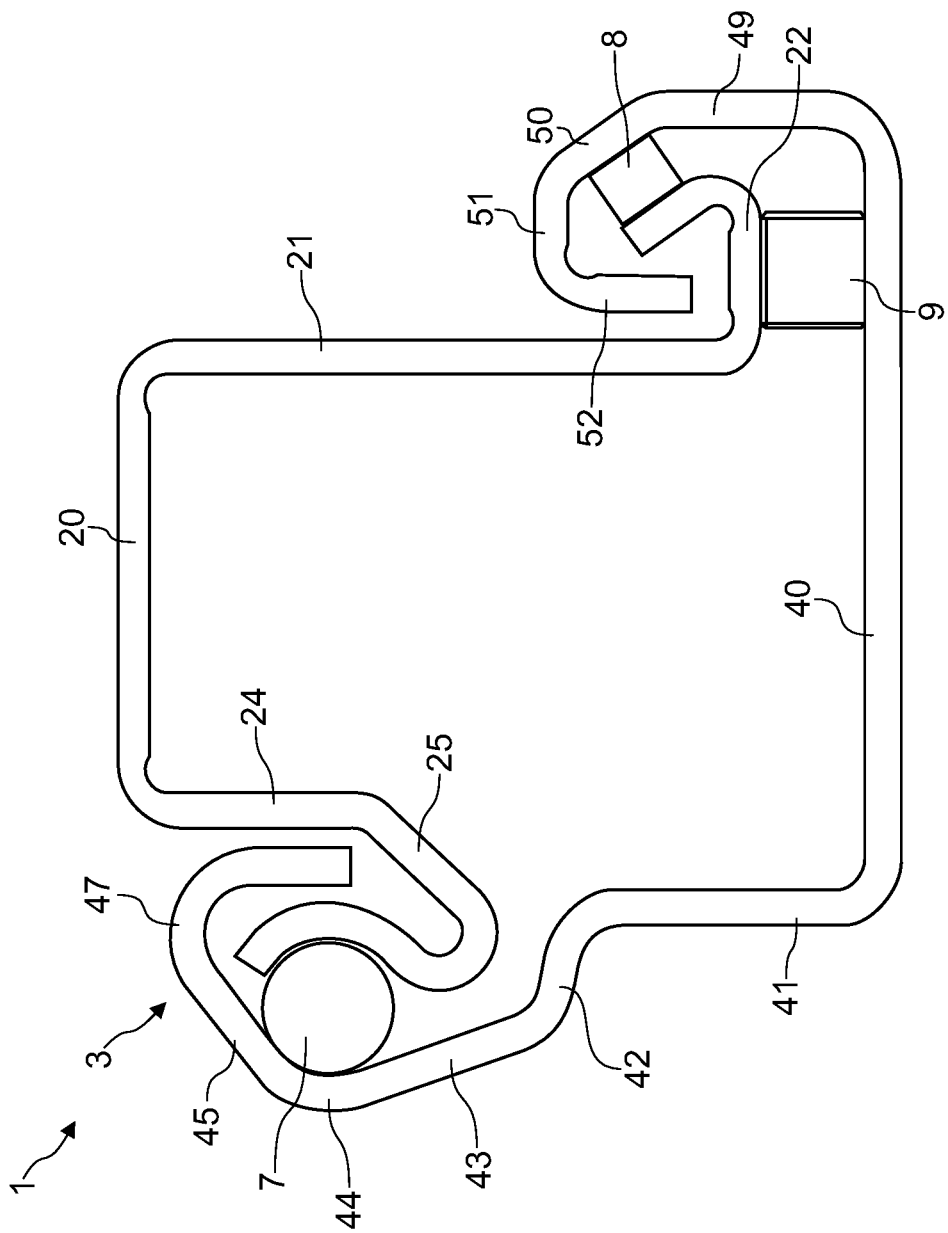
FIG. 5a is a longitudinal guide according to a third embodiment of the present invention.

FIG. 5a shows again the rail profile according to FIG. 1a. In the event of a crash, in this embodiment the inclined connecting legs 25 is fully supported on the entire surface of the opposite first connecting leg 42, which allows an even more effective support in the z-direction in the event of a crash.

Figure 5B:
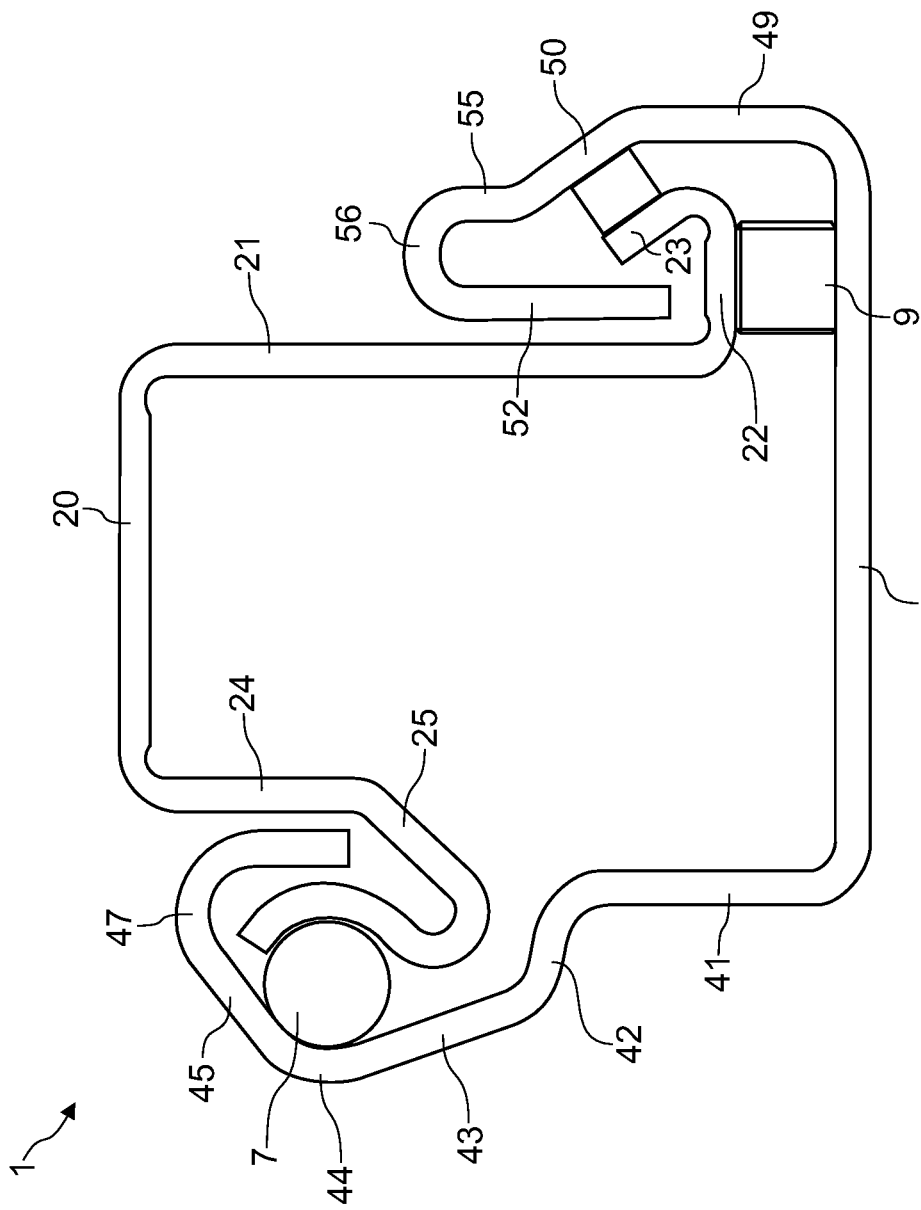
FIG. 5b shows a longitudinal guide according to a fourth embodiment of the present invention.

In the fourth embodiment shown in FIG. 5b at first according to the embodiment shown in FIG. 5 an inclined connecting leg 25 is provided, which extends obliquely downward. This may be the case, but is not necessarily so. In principle the inclined connecting leg 25 can also extend obliquely upwards. A further difference is the shaping of the second bearing area, namely that the contact area or inclined supporting leg 50 is followed by connecting leg 55, which is basically perpendicular to the base leg 40, which is bent in the bending section 56 by substantially 180°, and merges into the free end 52, which protrudes downwardly into the gap between the inclined supporting leg 23 and L-leg 21 and is perpendicular to the base leg 40. Between the contact area 50 and the opposite inclined connecting leg 23 further a bearing or support of the rollers 8 is accomplished, wherein the rollers 8 further have a lateral play in this bearing area 50, preferably a minor lateral play. This shaping of the embracing portion of the lower rail 4 enables a further stiffening due to the additional bending of the end of the lower rail 4.

In this context in the following a further important characteristic of the rail profile of the present invention will be discussed with reference to FIG. 2, which may be combined with the aforementioned aspects of the invention. According to FIG. 2, the top surface of the base leg 20 is not aligned with the upper area of reversal 47 in the first bearing area 3. Rather, the base leg 20 projects by a distance G from the upper area of reversal 47. In the unloaded state of the longitudinal guide 1 this distance G should be less than twice the thickness of the material of the upper rail, but should preferably lie near this upper limit. This allows a certain amount of "breathing" of the rail profile in the event of a vertical load, and in particular in the operating position when a relatively heavy weight person takes seat on the vehicle seat. In this loaded normal state the rail profile "sags", so that in particular the distance G decreases, namely up to the order of less than about 0.5 mm in the case of particularly heavy people, for example, with a body weight of 120 kg to 150 kg. Since the z-position of the balls 7 in the first bearing area 3 is substantially constant due to the shaping is, this "breathing of the rails" leads to a bending and pivoting of the inclined connecting leg 25 about the predetermined bending position 29. According to the present invention, the geometry of the rail profile is such that, in this loaded normal state, in particular if loaded by particularly heavy persons for example, with a body weight of 120 kg to 150 kg, all gap dimensions in the z-direction are exactly the same, in line with the manufacturing tolerances.

The longitudinal position of the rails relative to each other is determined by a conventional locking device as disclosed, for example, in documents DE 203 13 954 U1 and DE 101 27 153 A1 of the applicant or as described in European patent application EP 1316466 A1, the whole contents of which is hereby explicitly incorporated by way of reference. Examples of such locking devices are to be described in more detail below with reference to FIGS. 6 to 10, for which a basic profile according to the first embodiment is respectively considered. However, it should be noted explicitly that the aspects to be described in the following, which are related to the locking, in principle can also be independent of such a rail profile and could also be claimed by claims independent from the particular shaping of such a rail profile.

Figure 6:
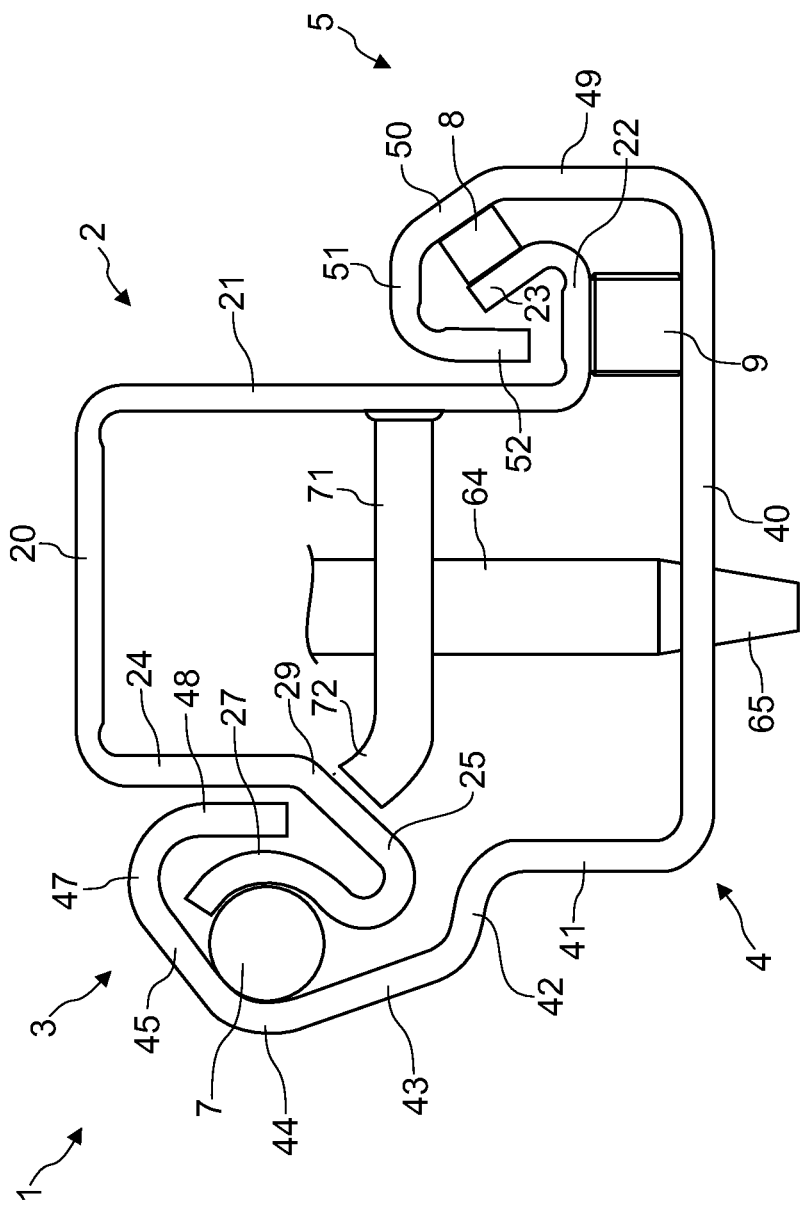
FIG. 6 is a sectional view according to the first embodiment of the longitudinal guide of the present invention with a locking device of a first exemplary embodiment of a longitudinal guide for motor vehicle seats.

According to FIG. 6, a guide web 71 is attached on the inside of the L-leg 21, for example by welding, the front free end of which is bent at an acute angle and passes into a supporting portion 72, the front face of which extends in parallel with the inclined connecting leg 25 of the upper rail 2. In the normal state a gap is formed between the bearing portion 72 and the inclined connecting leg 25. In the event of a crash, a mutual contact of the regions 25, 72 and thus a further support in the z-direction and y-direction may occur. In the guide web 71 openings (not shown) are formed through which the locking pins 64 of a locking means (not shown in detail) extend. At the front free end of the locking pins 64 frustoconical portions 65 are formed which engage locking openings in the known way or interfere with them, which are formed in the base leg 40 and are not shown here, in order to define the longitudinal position of the upper rail 2 relative to the lower rail 4.

Figure 7:
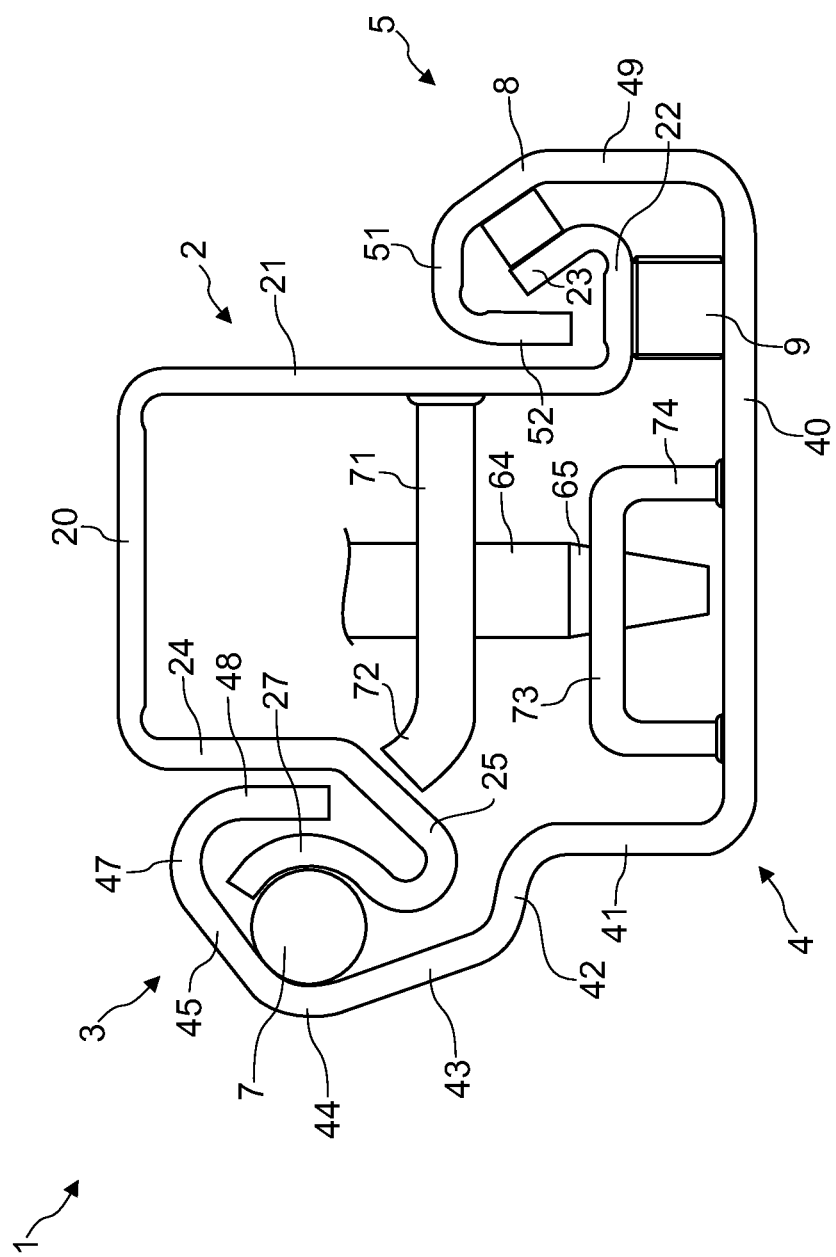
FIG. 7 shows a sectional view of the longitudinal guide according to the first embodiment with another exemplary locking device.

In contrast to the case of FIG. 6, according to FIG. 7 a locking web 73 is fixed to the base leg 40 by means of the two lateral vertical connecting webs 74, said locking web extending in longitudinal direction and being provided in the interior space of the rail profile. In such an embodiment the locking openings (not shown) are formed in the locking web 73, so that in the base leg 40 no locking openings need to be formed in the base leg 40, which would weaken the material thereof. In a further embodiment additional locking openings can also be formed in the base leg 40 in alignment with the locking openings in the locking web 73, and possibly with a smaller diameter than these.

Figure 8:
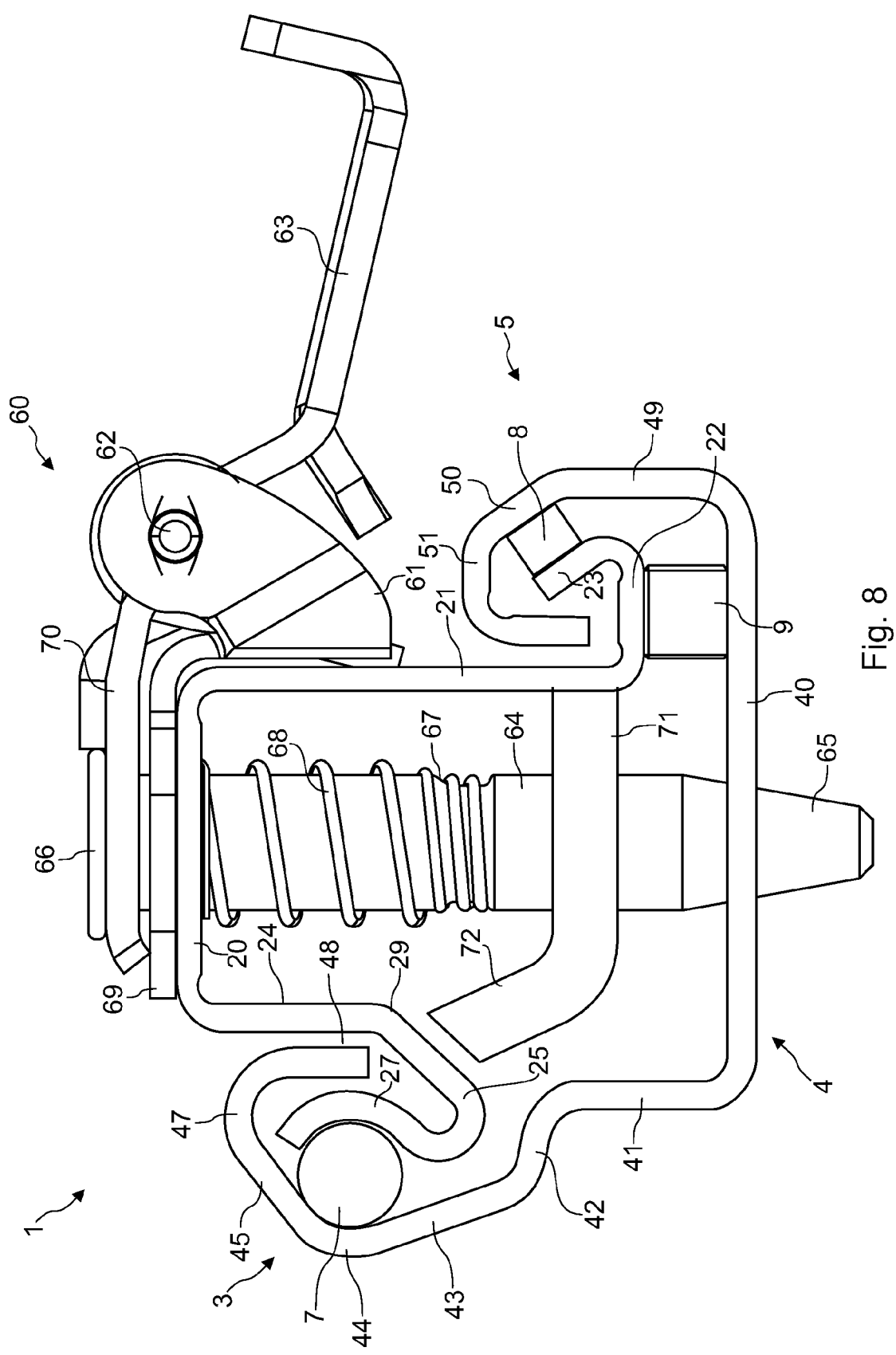
FIG. 8 is a sectional view of the longitudinal guide according to the first embodiment having another exemplary locking device and an easy entry mechanism.

FIG. 8 shows further details of a locking device, such as this may also be employed in the embodiments according to FIGS. 6 and 7. According to FIG. 8 openings, which are not shown in detail, are formed in the base leg 20, which are penetrated by the locking pins 64 of the locking device. The upper end of the locking pins 64 is formed by a pin plate 66 having a larger diameter. Above the guide web 71 a tapered portion 67 is formed on the locking pins 64, which serves as a receptacle for receiving the front end of a compression spring 68 whose opposite end is supported on the inside of the base leg 20, so that the lock pins 64 are resiliently biased against the lower base leg 40. On the outer side of the upper base leg 20 a support plate 69 is fixed, in particular welded, on which the claws 70 of the locking device are supported. The locking device is coupled to an easy-entry mechanism 60, which is fastened on the side surface of the L-leg 21 of the upper rail 2 via the base portion 61 and comprises a coupling member 63, which is coupled to the backrest of a motor vehicle seat (not shown). As disclosed for example in DE 101 27 153 A1 of the applicant, by means of the easy-entry mechanism a central unlocking of all locking pins can be accomplished when the backrest is pivoted towards the seat surface of the seat frame, so that the entire motor vehicle seat can be moved forward in order to enable the boarding of a passenger into a rear area. This function is especially useful for two-door cars or also in the rear area for vehicles with three or more rows. By actuating the easy entry mechanism or by manually operating the locking device, the locking pins 64 can be unlocked by lifting the claws 70 in order to allow a displacement of the seat in the longitudinal direction. According to FIG. 8 as a difference to FIGS. 6 and 7 the guide web 71 is mounted at a very low position on the L-leg 21 and the length of the supporting area 72, which extends obliquely upwards and outwardly from the rail, is correspondingly extended.

Figure 9:
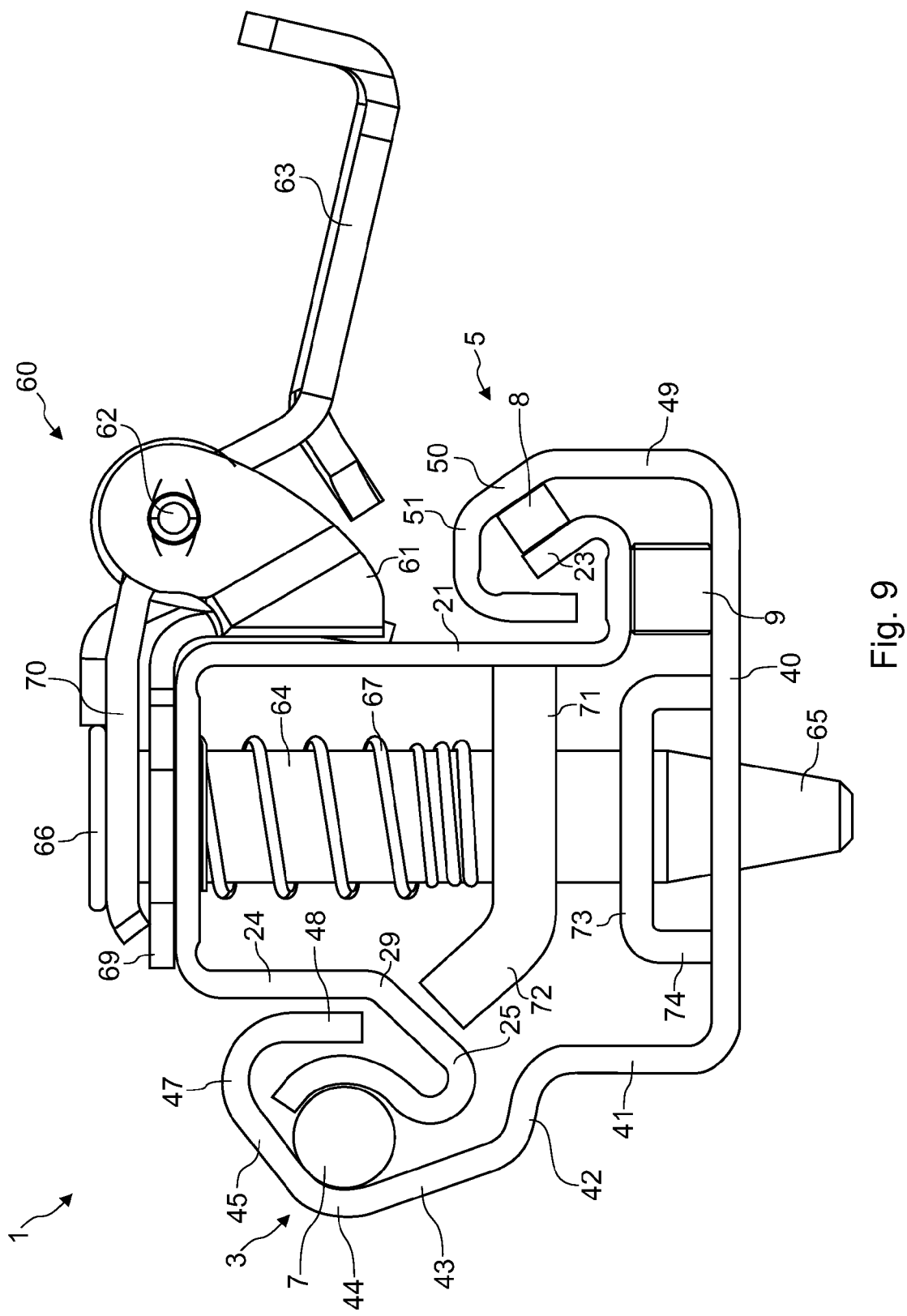
FIG. 9 is a sectional view of a longitudinal guide according to the first embodiment, with a further exemplary locking mechanism and with an easy entry mechanism.

In contrast to FIG. 8, according to FIG. 9 a locking web 73 is attached to the inside of the base leg 40 in a similar manner as in the embodiment according to FIG. 7, in which a plurality of locking openings are formed, which are regularly spaced to each other, to receive therein the locking pins 64 and to thereby lock the longitudinal position of the motor vehicle seat. Although it is shown in FIG. 9, that the frustoconical pins 65 also penetrate openings (not shown) in the base leg 40 for locking, according to this embodiment the locking basically can also be accomplished only by means of the locking openings (not shown) in the locking web 73 so that no locking openings need to be formed in the base leg 40.

Figure 10:
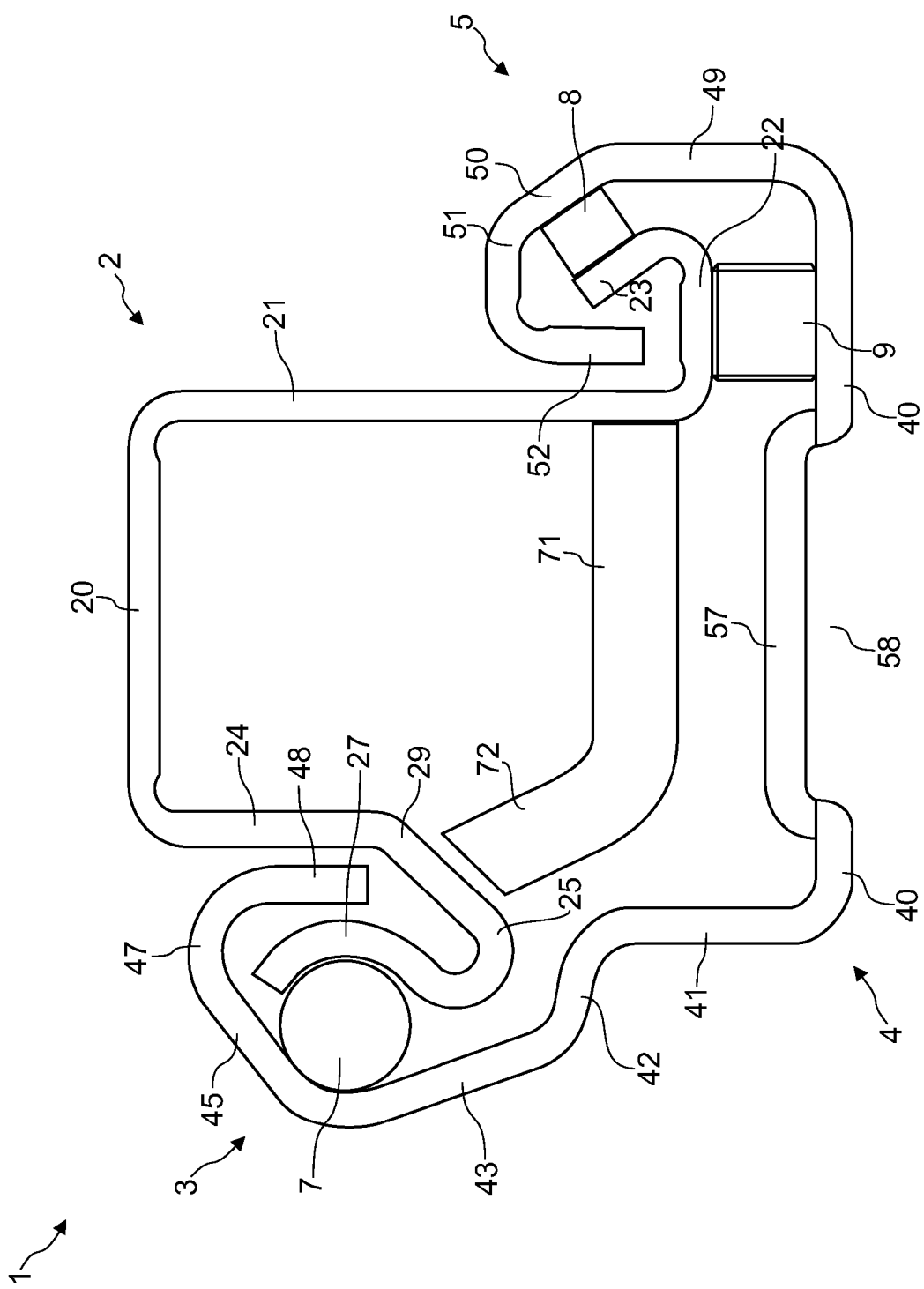
FIG. 10 is a sectional view of a longitudinal guide according to the first embodiment with a modified guide web of the locking device according to FIG. 6, in which also the base leg of the lower rail is modified.

Deviating from all of the above embodiments, in the embodiment according to FIG. 10 the lower base leg 40 is interrupted in y-direction while forming a free space 58 which is bridged by means of a connecting web 57, which is attached, in particular welded, to the two ends of the lower base leg 40. This free space 58 and the connecting web 57 may extend over the entire length of the lower rail 4, but may also be shorter than the lower rail, so that the base leg is not necessarily interrupted at the front and/or rear end of the lower rail. The connecting web 57 may, in particular consist of a harder material than the lower base leg 40 so as to receive the locking pins in the non-illustrated locking openings more reliably. The connecting web 57 can be used as a complement, of course, to secure the lower rail 4 at the bottom of the vehicle interior.

Figure 11:
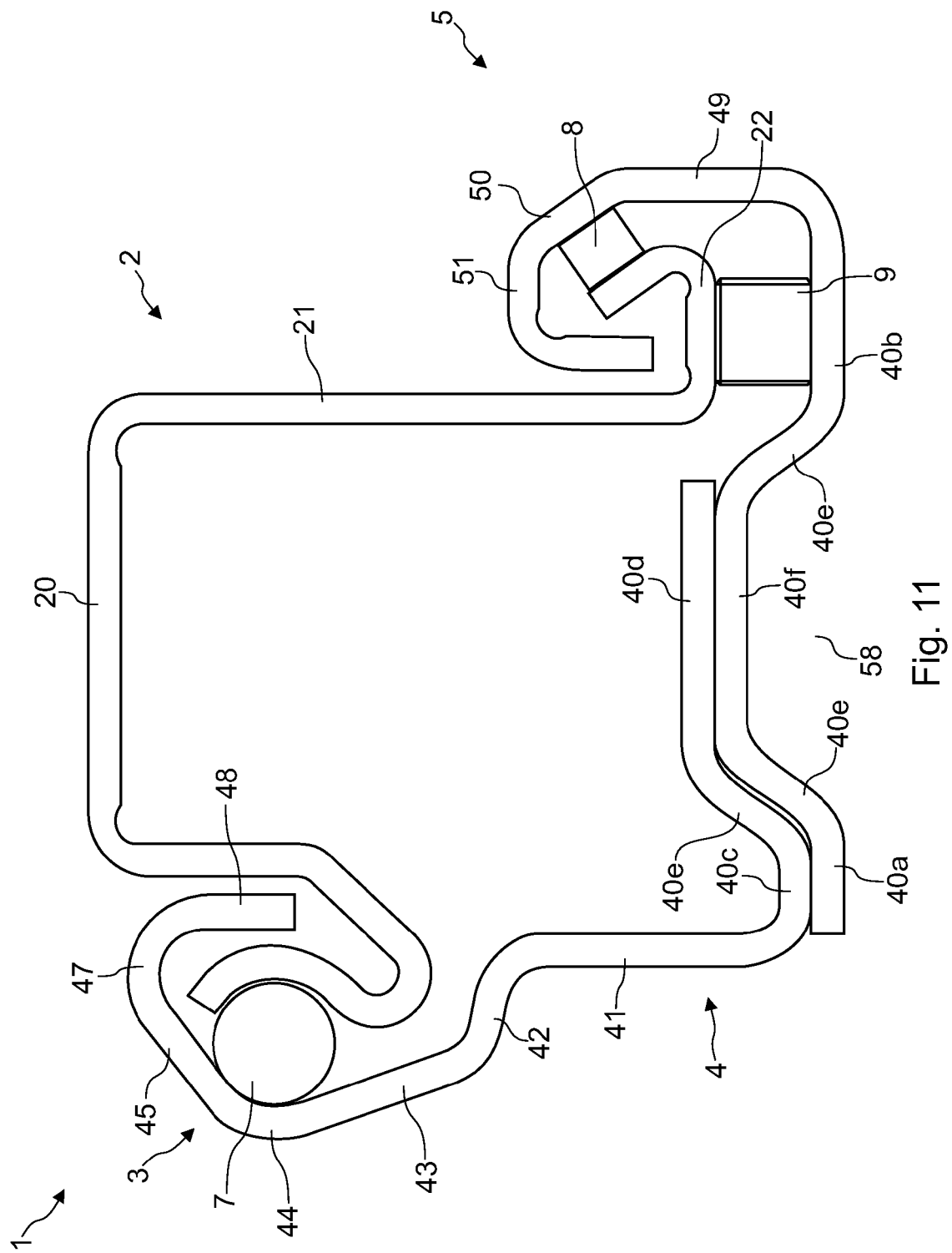
FIG. 11 is a sectional view of a longitudinal guide according to a fifth embodiment of the present invention.

Deviating from FIG. 10 according to FIG. 11, the lower base leg 40 is formed to overlap, that is with two mutually overlapping base legs 40d and 40f, which are in a full contact with each other and which are preferably rigidly connected with each other, in particular by welding, also by means of a plurality of welding points. Here, the lower base leg again extends over substantially the entire width of the interior space I of the rail profile and thus has base legs 40a, 40b, which are aligned with each other and are followed by connecting legs 40e, which extend obliquely upwards and inwards to the rail, between which finally the connecting leg 40f is formed centrically, which is formed symmetrical to the inner space of the rail profile formed by the base leg 21 and the connecting leg 24 of the lower rail 4. In a corresponding manner, the length of the L-leg 41 is reduced in this embodiment by the material thickness of the lower rail 4, so that the base leg 40c is followed by the connecting leg 40e, which extends obliquely upwards and inwards to the rail, which is followed by the base leg 40d. In this embodiment the base leg 40b again also serves as a bearing area for the rollers 9 in the second bearing area, as described above.

FIGS. 12 to 18 disclose further modifications in the region of the base leg 40 of a lower rail 4 according to further embodiments which shall cooperate in a form-fitting manner or by positive fitting with a locking device not described hereinafter in more detail.

Figure 12:
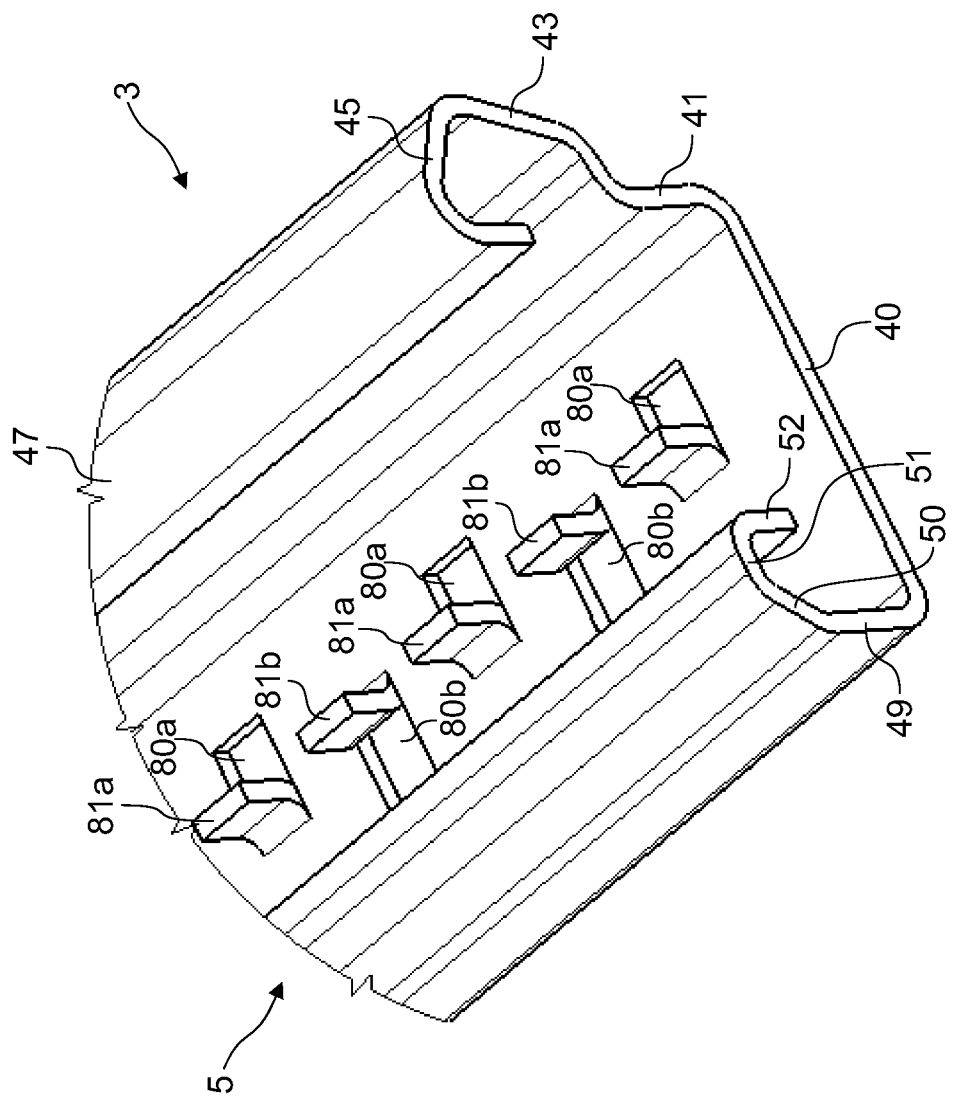
FIG. 12 is a partial perspective view from above of a lower rail with locking teeth for a locking device (not shown) according to a further embodiment.
Figure 13:
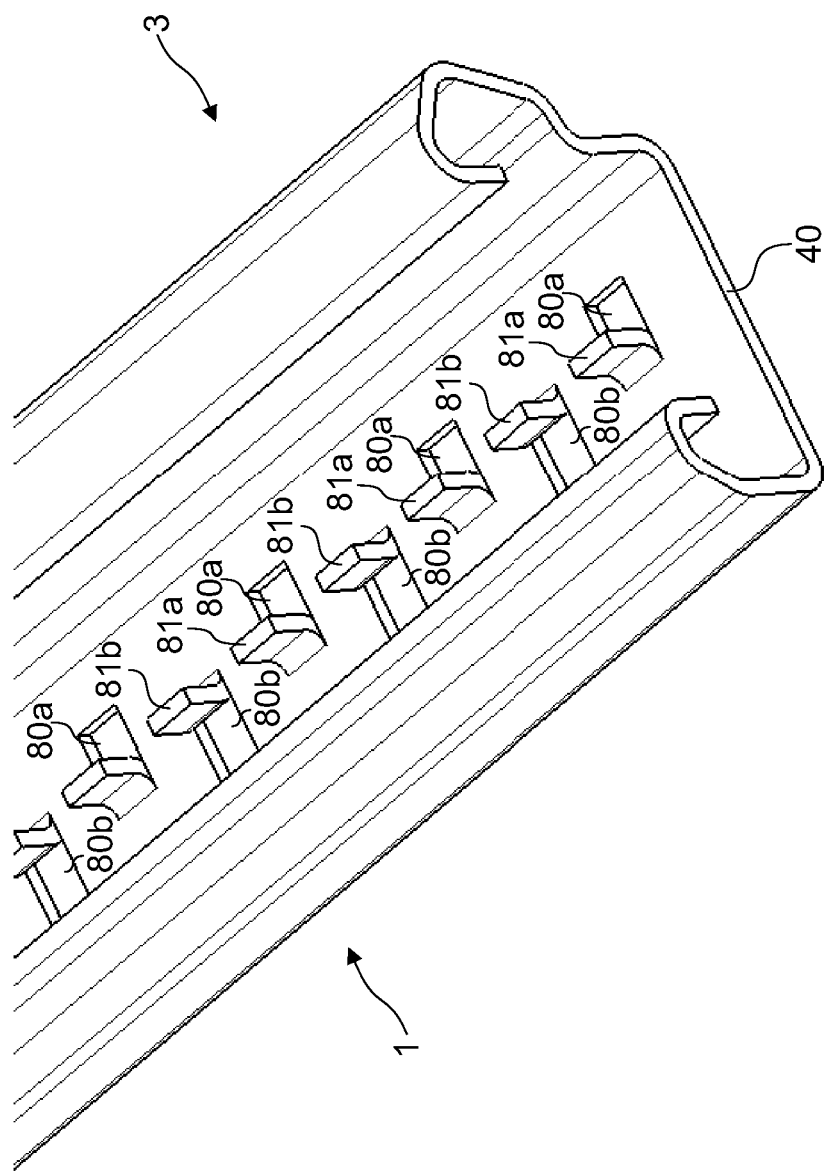
FIG. 13 is a magnified partial view of the lower rail according to FIG. 12.

For this purpose, according to FIG. 12 evenly spaced recesses 80a, 80b are formed in the base leg 40, if viewed in the longitudinal direction, from which locking teeth 81a, 81b protrude substantially perpendicularly, which shall cooperate in a form-fitting manner or by friction with locking devices not specified herein in detail. The recesses are divided into two alternating groups of recesses 80a and 80b, which are alternately offset transversely to the longitudinal direction of the rail. The recesses 80a, 80b can be formed by appropriate processing steps, such as punching or laser cutting, whereby the locking teeth 81a, 81b are bent in a suitable manner. FIG. 13 shows an enlarged sectional view of the embodiment according to FIG. 12.

Figure 14:
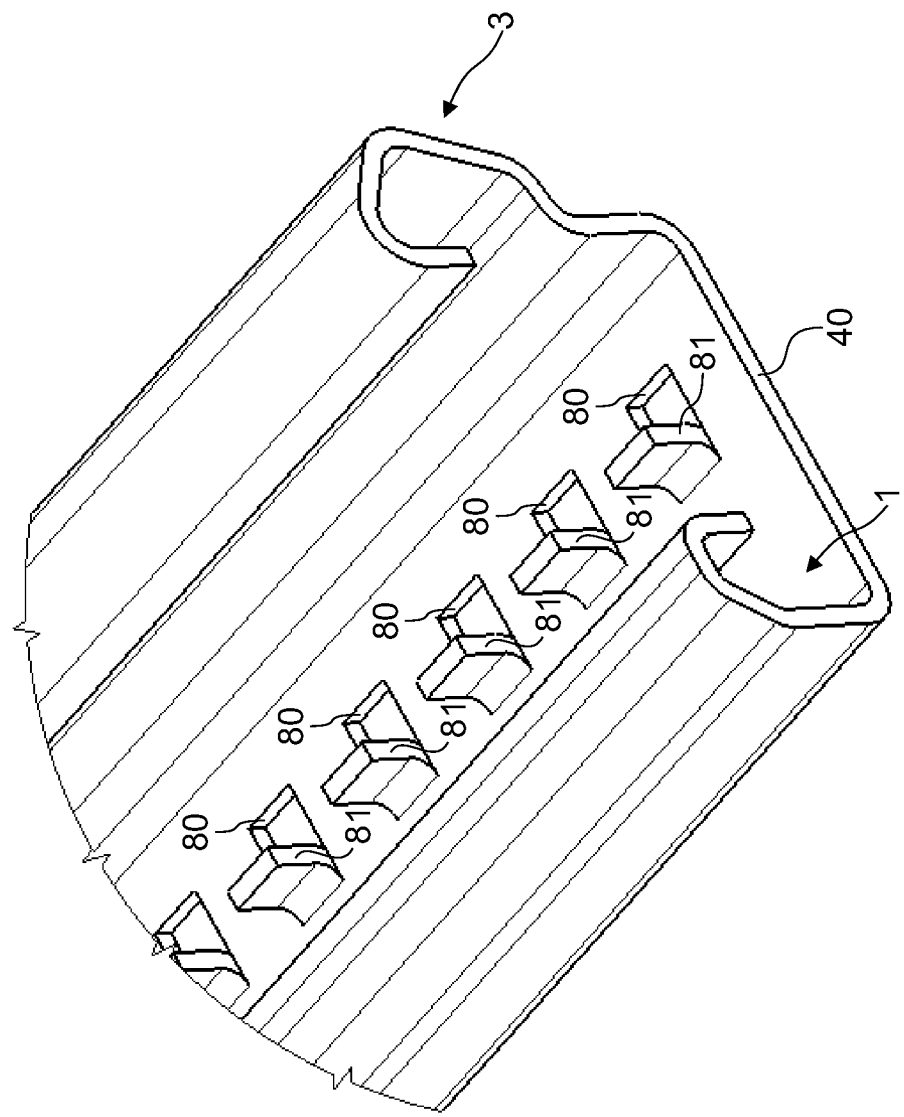
FIG. 14 is a partial perspective view from above of a lower rail with locking teeth for a locking device (not shown) according to another embodiment.

In contrast to FIGS. 12 and 13 in the embodiment according to FIG. 14 the recesses 80 are aligned with each other in the longitudinal direction of the rail and are arranged at even intervals, namely in the middle of the L-shaped region of the lower rail 4. Thus, the locking teeth 81 are bent in the same directions, deviating from FIGS. 12 and 13 respectively.

Figure 15:
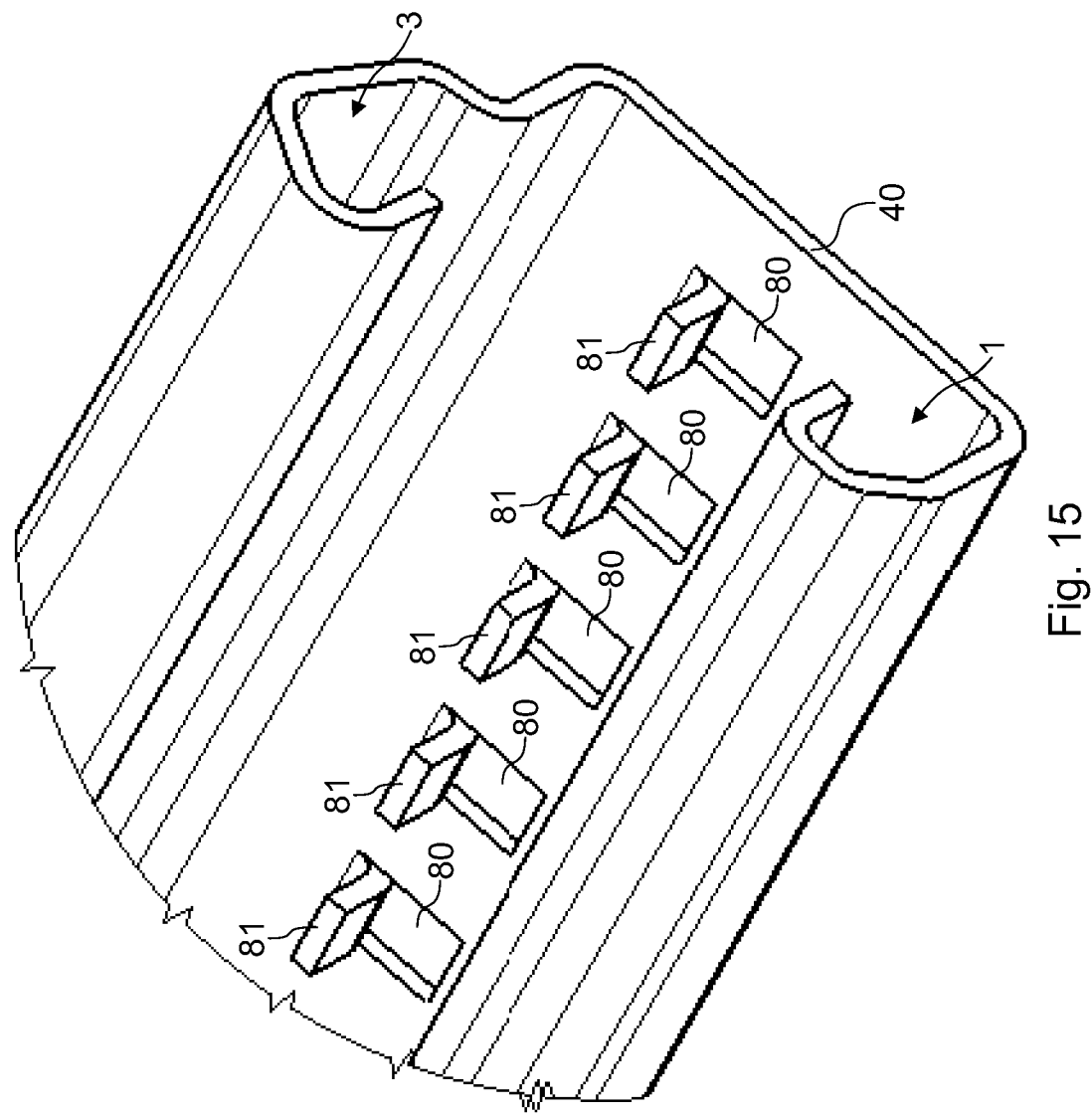
FIG. 15 is a partial perspective view from above of a lower rail with locking teeth for a locking device (not shown) according to a further embodiment.

Deviating from FIG. 14, in the embodiment according to FIG. 15 the locking teeth are oriented in the opposite direction.

Figure 16:
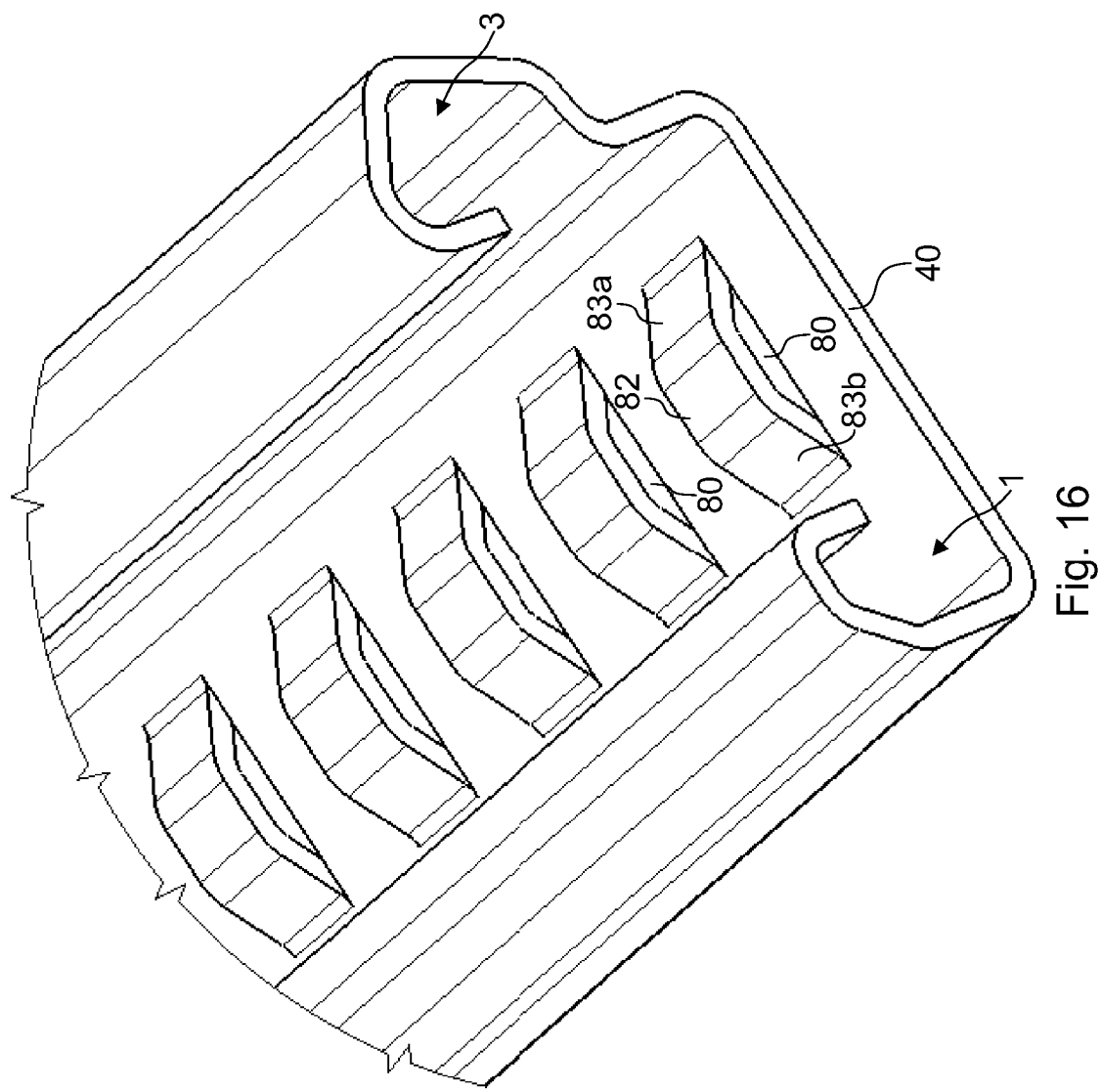
FIG. 16 is a partial perspective view from above of a lower rail with locking teeth for a locking device (not shown) according to a further embodiment.

Deviating from the previous embodiments, in the embodiment according to FIG. 16 locking lugs 82 are formed instead of locking teeth, which are respectively connected to the base leg 40 of the lower rail 4 via lateral connecting webs 83a, 83b and which are formed integrally therewith. Such locking lugs 82 may be formed by appropriately punching or laser cutting of rectangular recesses and stamping or deforming of the so formed areas.

Figure 17:
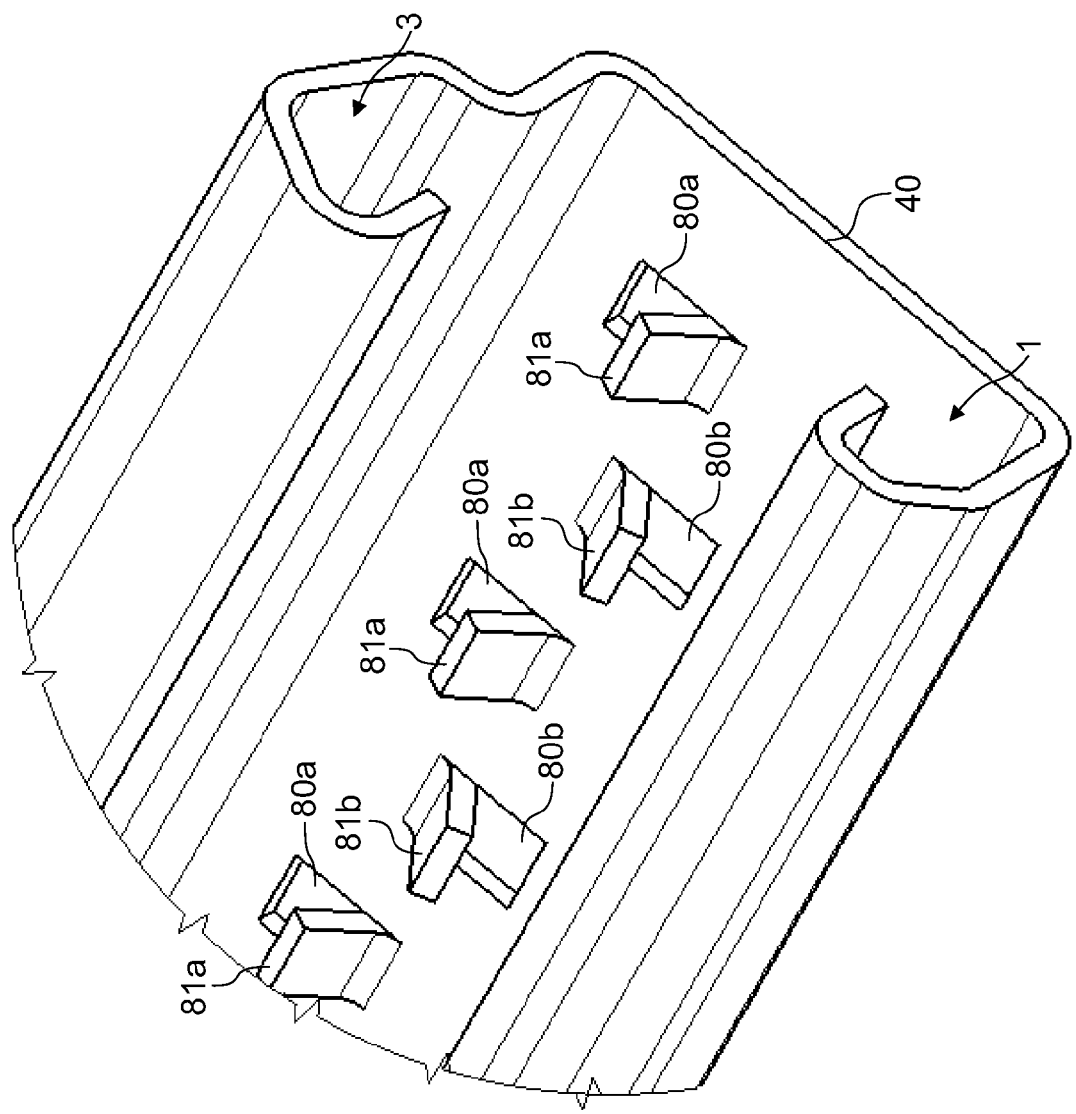
FIG. 17 is a partial perspective view from above of a lower rail with locking teeth for a locking device (not shown) according to a further embodiment.

Deviating from the embodiments according to FIGS. 12 to 15, in the embodiment according to FIG. 17 the locking teeth 81a, 81b are not respectively bent by 90° relative to the base leg 40 but instead at an acute angle which may be, for example 60°. As well as in the embodiment according to FIG. 13, the locking teeth 81a, 81b are oriented in opposite directions, wherein the recesses 80a, 80b are divided into two alternating groups of recesses 80a and 80b, that are alternately offset transversely to the longitudinal direction of the rail, as in the exemplary embodiment according to FIGS. 12 and 13.

Figure 18:
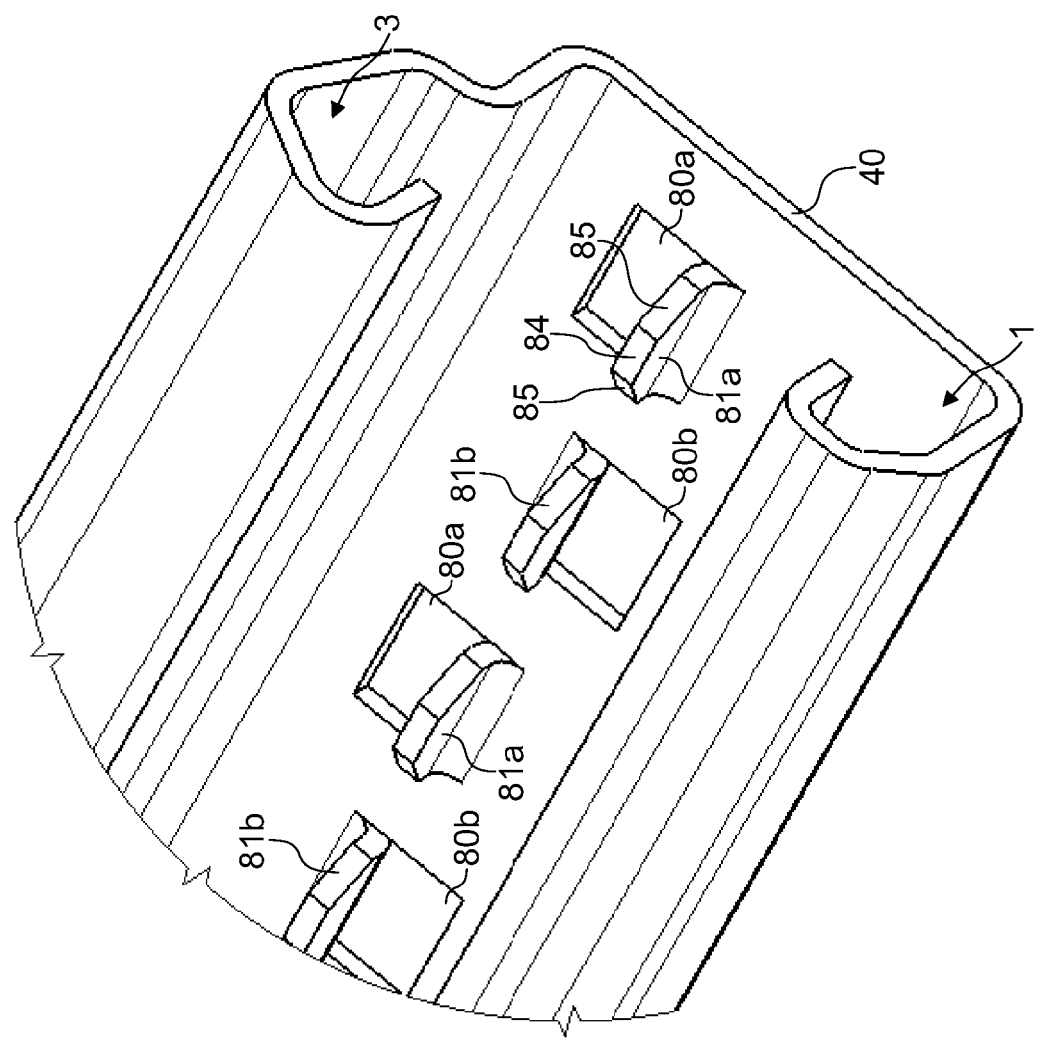
FIG. 18 is a partial perspective view from above of a lower rail with locking teeth for a locking device (not shown) according to a further embodiment.

Finally, FIG. 18 shows a further embodiment, wherein the locking teeth 81a, 81b are not rectangular but tapered, having a flattened locking tip 84 which forms the end of two lateral inclined connecting sections 85.

Although above in connection with the first connecting leg 42 it has always been disclosed that it extends obliquely upwards and seemed outwardly of the rail from the L-leg 41 of the lower rail 4, in this area there is space for more advantageous modifications, which will be explained in an exemplary manner with reference to the following FIGS. 19 and 20, but can also correspondingly be applied to all of the aforesaid embodiments.

Figure 19:
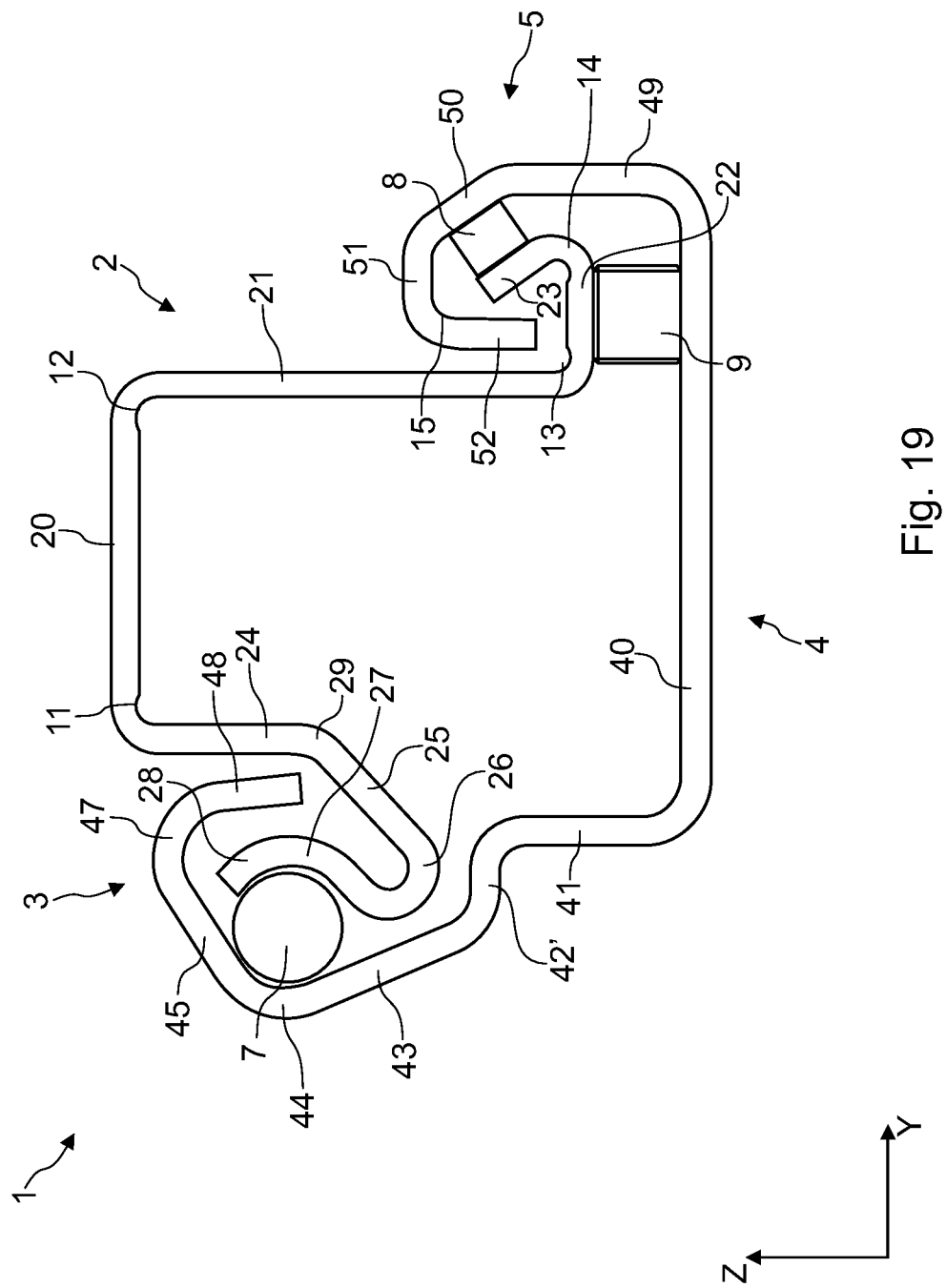
FIG. 19 is a sectional view of a longitudinal guide according to a further embodiment of the present invention.

FIG. 19 shows a sectional view of an exemplary modification of the longitudinal guide according to FIG. 1a, wherein the first connecting leg 42' extends substantially horizontally between the L-leg 41 of the lower rail 4 and the central connecting leg 43, preferably horizontally and outwards from the rail. In the event of a crash, particularly in the event of a frontal impact of the vehicle or a rear-end collision, the rail strives forward relative to the body due to the inertia. However, since the movement of the slide rail is delimited due to locking, the rear part of the slide rail is lifted towards the front region of the vehicle body and bent. Therefore a strong bending moment acts on the slide rail, in particular strongly vertically downwardly acting forces, so that the opposite bending area 26 would be pressed vertically downward until it either gets in direct contact with the directly opposite first connecting leg 42' or initially gets in contact at the central connecting leg 43, slides downwards at this central connecting leg until it gets in contact at the opposite first connecting leg 42'. Due to the horizontal orientation of the first connecting leg 42' a further sliding of the opposite bending area 26 inwards to the rail is effectively prevented and thus a "collapsing" of the rail profile 1 is prevented.

As will become easily apparent to the skilled person, the first connecting leg 42' alternatively can extend downwards and outwards from the rail at a relatively small acute angle relative to a horizontal line or relative to the base leg 40 of the lower rail 4, in the same manner as outlined above with reference to FIG. 1b. In particular this angle may be in the range between 10° and 30°, more preferably between 15° and 20°. In the event of a crash, especially at very strong forces acting vertically downwards, and in the event of a contact of the bending area 26 at the opposite first connecting leg 42', a further sliding of the opposite bending area 26 inwards to the rail and thus a "collapsing" of the rail profile 1 can be effectively prevented due to the direction in which the first connecting leg 42' extends. At most, the bending area 26 would slip gradually further along the first connecting leg 42' obliquely and outwardly, wherein the region a mutual contact would, however, be in any case relatively close to or on a virtual center line 18 (see FIG. 3) and thus a further bending of the first connecting leg 42' would occur only if extremely high forces would prevail.

Figure 20:
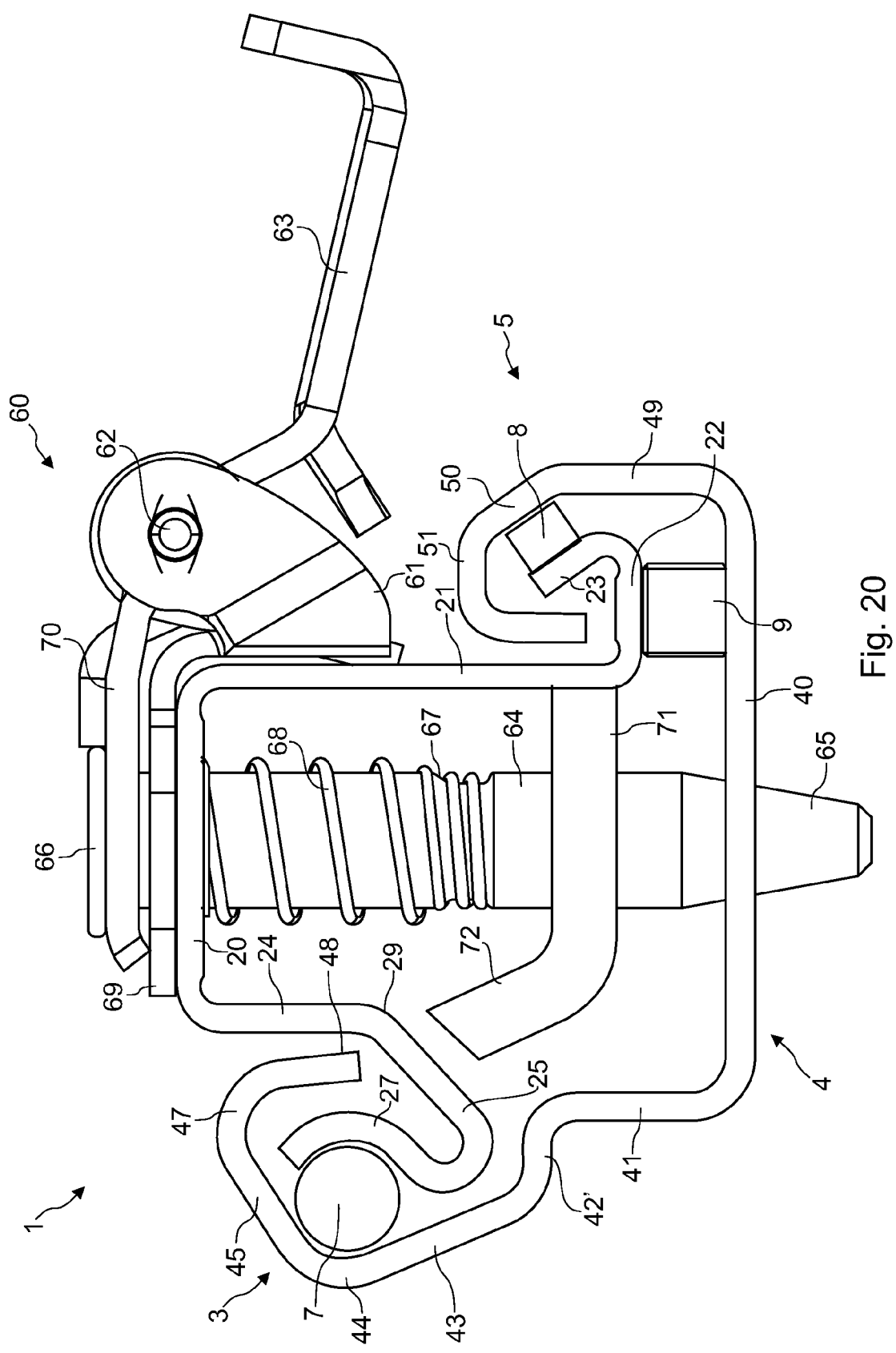
FIG. 20 is a cross sectional view of another exemplary modification of the further embodiment according to FIG. 19, with an exemplary locking device and easy-entry mechanism as described with reference to FIG. 8.

According to the invention this modification in the area of the first connecting leg 42' may be carried out for all embodiments set forth above, as illustrated by way of example with reference to FIG. 20, which shows a sectional view of another exemplary modification of the embodiment according to FIG. 19 with an exemplary locking device and easy-entry-mechanism, as described above with reference to FIG. 8. For a good support, the gap between the first connecting leg 42' and the opposite bending area 26 should be small. This support can be further enhanced by the cooperation of the inclined connecting leg 25 with a directly opposite support portion of a guiding or locking web 71 (see FIG. 6), as described above by way of example with reference to FIG. 6.

Embodiment 1

In an exemplary embodiment of a rail profile according to the first embodiment, the following exemplary geometry and dimension may apply: the thickness of the upper rail is 1.5 mm, whereas the thickness of the lower rail is 1.7 mm (manufacturing tolerance each 0.08 mm). The depth of the embossments, as indicated in area 12 by the arrow in FIG. 2, is 0.2 mm. In the region of the embossments 10 to 15 the radius of curvature or the bending radius of the respective rail portion is smaller than without embossments. The total width B is 47.0 mm, the clear inner width of the interior space I is 23.5 mm. The clear inner width C of the upper region of the interior space is 18.4 mm, the distance of the ball centers D is 38.5 mm. The dimensions of the gaps in y-direction are preferably all identical and are 1.0±0.02 mm.

The maximum height K of the first bearing area in the unloaded state is 32.5 mm, the level of the balls 7, as measured from the underside of the base leg 40, is 25 mm, the length of the L-leg 41 is 15 mm, the maximum height of the second bearing area is equal to 16.8 mm, the level of the upper rollers in the second bearing area, as measured from the underside of the base leg 40, is 12.5 mm. The maximum height H of the rail profile is 35 mm. The dimensions of all gaps in the z-direction, in particular of gaps a to c, and preferably of gapes a to d, are all the same and amount to 1.02±0.02 mm. The gap width e is 1.05 mm, but can be selected the same as the gap dimensions in the z-direction.

The radius of the balls 7 is 5.0 mm, the bending radius of the circular arc-shaped bearing area 44 is 4.8 mm, which also applies to the radius of curvature of the circular arc-shaped bearing area 27 and the radius of curvature of the corner area 44 in the first bearing area. The radius of curvature of the bending area 26 is 2.2 mm, the embossment 10 in the bending area 26 is engaged by about 0.2 mm, so that there the radius of curvature is 1.8 mm.

The length O of the free end 48 is 7.8 mm, the length of the free end 52 is 5.1 mm, as viewed in each case until the underside of the associated base leg 47 and 51, respectively. The acute angle included by the inclined supporting leg 23 and the base leg 22 is 55°. The diameter of the upper rollers 8 in the second bearing area is 3.0 mm.

The radius of the lower rollers 9 in the second bearing area is 5.0 or 6.0 mm.

Other Embodiments

In the following improvements of a rail profile according to the present invention will be discussed in an exemplary manner, taking as reference a rail profile according to the German utility model DE 20 2004 010 49 U1 that has a specific line weight (weight per unit length of longitudinal guide in the longitudinal direction) of 2.6 g/mm for a given a material thickness of the upper and lower rail of 1.7 mm, an overall width B (see FIG. 2) of 48 mm and a total height H of 35 mm. For the reference profile and the profiles to be discussed herein particularly the total line weight (in units of g/mm per unit length of the rail profile) and the area moment of inertia in the z-direction (in units of $mm^{-4}$) will be compared.

In a first embodiment corresponding to the profile according to FIG. 1a, the material thickness of the lower rail was kept constant (1.7 mm), however, the material thickness of the upper rail was reduced to 1.5 mm. The total width was reduced to 47 mm, but the width at the lower end of the rail profile could be significantly reduced and the total height could be increased by 7% to 37.5 mm. The total line weight was essentially the same (deviation: 1%), but the area moment of inertia of the lower rail could be increased by 31% and the area moment of inertia of the upper rail by 17%.

In a second embodiment corresponding to the profile according to FIG. 1a, the material thickness of the lower rail 1 was increased to 8 mm and the material thickness of the upper rail was reduced to 1.5 mm. The total width was reduced to 47.2 mm, but the width at the lower end of the rail profile could be significantly reduced and the total height could be increased by 7% to 37.6 mm. Total weight of the line was about 10% larger. Herein, the area moment of inertia of the lower rail could be increased by 48% and the area moment of inertia of the upper rail could be increased by 17%.

In a third embodiment corresponding to the profile according to FIG. 5b, the material thickness of the lower rail was increased to 1.8 mm and the material thickness of the upper rail is was increased to 1.5 mm. The total width was reduced to 47.2 mm, but the width at the lower end of the rail profile could be reduced significantly and the total height could be increased by 7% to 37.6 mm. The total line weight was about 12% larger. Herein, the area moment of inertia of the lower rail could be increased by 49% and the area moment of inertia of the upper rail could be increased by 20%.

Due to the aforementioned geometry, the "difference in height" between the balls 7 and the upper rollers 8 in the second bearing area 5 can be increased further in the vertical direction as compared to the prior art, to thereby increase the aforementioned diagonal biasing of the bearing areas 3, 5 relative to each other.

It is expressly pointed out that the manner of forming the base leg of the lower rail and of the locking of the rail profile as described above with reference to FIGS. 6 to 11 and FIGS. 12 to 18 can in principle be considered independently from the rail profile according to the present invention described with reference to the FIGS. 1 to 5b, and can also be used in rail profiles with any other geometries, in particular in a rail profile in accordance with WO 2006/10 60 44 A2 or DE 101 27 153 A1 of the applicant. As regards further details of the locking device and of the easy-entry mechanism reference is made especially to DE 101 27 153 A of the applicant, the entire content of which is hereby expressly incorporated in the present application by way of reference.

Although above various aspects of the invention have been described in terms of specific embodiments it is expressly pointed out that the various aspects of the invention can also be considered and claimed independently, especially as concerns the rail profile, the actual geometric location of the two bearing areas, the specific configuration of the two bearing areas, the further stiffening of the rail profiles by means of embossings or embossments, the selected dimensions of the gaps and the geometry and details of the configuration of the base leg of the lower rail and the locking device. These aspects of the invention are intended expressly to be separately subject thereof of patent applications claiming priority, divisional applications or patent applications directed to further developments.

LIST OF REFERENCE NUMBERS

1 Rail/longitudinal guide
2 Upper rail
3 First bearing area
4 Lower rail
5 Second bearing area
6 Ball
7 Ball
8 Roll
9 Roll
10 Embossment
11 Embossment
12 Embossment
13 Embossment
14 Embossment
15 Embossment
17 virtual extension line
18 Center line
19 Contact point of the balls 7 in the first bearing area
20 Base leg of the upper rail
21 L-leg
22 Supporting leg
23 Free end/oblique supporting leg
24 Connecting leg
25 Oblique connecting leg
26 Bending region
27 Embracing area/bearing area
28 Free end
29 Predetermined bending position
40 Base leg of the lower rail
40a base leg
40b base leg
40c base leg
40d base leg
40e Oblique connecting leg
40f connecting leg
41 L-leg
42 Oblique connecting leg
42' Connecting leg
43 central connecting leg
44 embracing area/bearing area
45 upper connecting leg 47 Top area of reversal
48 Free end
50 Supporting portion
51 Base leg in the embracing portion
52 Free end
53 Connecting leg
54 Supporting leg
55 Connecting leg
56 Bending region
57 Connecting web
58 Clearance
60 Easy-entry mechanism
61 Base portion
62 Rotation axis
63 Coupling member
64 Locking pin
65 Taper pin
66 Pin plate
67 Tapered section/receptacle for spring
68 compression spring
69 support plate
70 claw
71 guide web
72 support portion
73 Locking web
74 connecting web
80 recess
80a recess (first group)
80b recess (second group)
81 locking tooth
81a locking tooth (first group)
81b locking tooth (second group)
82 locking lug
83a left connecting web
83b right connecting web
84 tip
85 inclined surface

The invention claimed is:

1. A longitudinal guide for vehicle seats, comprising two elongate rails, each comprising a lower rail and an upper rail supported thereon so as to be movable in a longitudinal direction, wherein
each upper rail and each lower rail comprises an L-shaped region, if viewed in profile, and two end portions which are respectively connected to the L-shaped region,
the end portions of the respective upper rail and of the respective lower rail form diagonally opposite embracing areas under mutual interlocking,
each elongate rail comprises a first bearing area and a second bearing area for guiding means, which are biased to each other and formed by opposite end portions of the respective upper rail and portions of the associated lower rail,
the L-shaped region of the upper rail is formed by a base leg forming the uppermost portion of the upper rail and an L-leg projecting from the base leg perpendicularly, and
the L-shaped region of the lower rail is formed by a base leg forming the bottommost portion of the lower rail and an L-leg projecting from the base leg perpendicularly,
wherein
the L-leg of the lower rail is followed by a first connecting leg of the lower rail projecting obliquely outwards from the L-leg of the lower rail and by a second bearing leg of the lower rail projecting obliquely upwardly from the first connecting leg of the lower rail and outwards from the upper rail, wherein
the first bearing area is formed between an end portion of the upper rail formed as a circular arc-shaped profile and an opposite corner area of the lower rail formed on the second bearing leg of the lower rail and disposed outwards from the upper rail relative to the end portion of the upper rail formed as a circular arc-shaped profile, and
a single group of guiding means formed by a plurality of balls disposed in a row in a longitudinal direction of the two elongate rails is supported in the first bearing area, wherein
contact points of the plurality of balls at the end portion of the upper rail formed as the circular arc-shaped profile are on an opposite side of a virtual center line through the L-leg of the lower rail, if viewed from an interior space (I) of the elongate rails, or lie on said virtual center line, and
wherein the base leg of the upper rail is followed by a connecting leg of the upper rail, which is opposite to the L-leg of the upper rail and extends in parallel therewith, by a slanted connecting leg of the upper rail and by a bent portion, which is followed by the end portion of the upper rail formed as a circular arc-shaped profile,
a predetermined bending position is provided in a transition area between the connecting leg of the upper rail and the slanted connecting leg of the upper rail, and the predetermined bending position is less stiff than a curved area connecting the base leg of the upper rail and the connecting leg of the upper rail and than the bent portion.

2. The longitudinal guide as claimed in claim 1, wherein the first connecting leg projects obliquely upwardly from the L-leg of the lower rail.

3. The longitudinal guide as claimed in claim 1, wherein the distance between the contact points to the virtual center line is less than a material thickness (SOS) of the respective upper rail.

4. The longitudinal guide as claimed in claim 3, wherein the contact points further lie on a virtual extension line of an outer side of the L-leg of the lower rail or lie outside of this virtual extension line, if viewed from an interior space (I) of the elongate rails.

5. The longitudinal guide as claimed in claim 4, wherein the distance of the contact points to the virtual extension line is less than a material thickness (SOS, SUS) of the upper or lower rail.

6. The longitudinal guide as claimed in claim 4, wherein the distance of the contact points to the virtual extension line is less than a material thickness (SOS) of the upper rail.

7. The longitudinal guide as claimed in claim 6, wherein the contact points lie outside of the virtual extension line of an outer side of the L-leg of the lower rail, if viewed from an interior space (I) of the elongate rails, or lie on this virtual extension line.

8. The longitudinal guide as claimed in claim 7, wherein the distance of the contact points to the virtual extension line is less than a material thickness (SOS, SUS) of the upper or lower rail.

9. The longitudinal guide as claimed in claim 1, wherein the predetermined bending position has a smaller torsional rigidity.

10. The longitudinal guide as claimed in claim 9, wherein the bent portion lies on the virtual center line through the L-leg of the lower rail, which projects perpendicularly from the base leg of the lower rail.

11. The longitudinal guide as claimed in claim 1, wherein a plurality of first rollers and a plurality of second rollers
   are supported in the second bearing area diagonally opposite to the first bearing area,
   the plurality of first rollers are supported with a lateral play between the base leg of the lower rail and an opposite supporting leg of the upper rail extending in parallel thereto,
   the plurality of second rollers are supported between an end portion of the respective upper rail, extending under an acute angle obliquely upwards from the supporting leg of the upper rail, and an opposite inclined supporting leg of the lower rail, and
   the inclined supporting leg of the lower rail is formed between a connecting leg of the lower rail adjoining the base leg of the lower rail and extending vertically upwardly and an adjoined horizontal base leg of the embracing area in the end portion of the lower rail.

12. The longitudinal guide as claimed in claim 11, wherein one or more of a corner area between the base leg of the lower rail and the L-leg of the lower rail, a transition area between the L-leg of the lower rail and the first connecting leg of the lower rail, and a transition area between the first connecting leg of the lower rail and the second bearing leg of the lower rail, is provided with an embossment formed by cold work forming to effect a higher stiffness.

13. The longitudinal guide as claimed in claim 12, wherein the embossments are formed with an even curvature.

* * * * *